United States Patent
Irons et al.

(10) Patent No.: US 9,120,690 B2
(45) Date of Patent: Sep. 1, 2015

(54) VORTEX AIR INLET SYSTEM, COMPRESSOR SYSTEM AND RELATED METHOD

(75) Inventors: George E. Irons, Ozark, MO (US); Paul R. Vinsand, Springfield, MO (US); Dwayne S. Matthews, Kansas City, MO (US); John T. Dobyns, Springfield, MO (US); Frans Ploeger, Hilleroed (DK); Donald E. Munsell, Springfield, MO (US); Alex deVries, Battlefield, MO (US)

(73) Assignees: Siemens Energy, Inc., Orlando, FL (US); Siemens Turbomachinery Equipment A/S, Helsingoer (DK)

( * ) Notice: Subject to any disclaimer, the term of this patent is extended or adjusted under 35 U.S.C. 154(b) by 58 days.

(21) Appl. No.: 13/885,793

(22) PCT Filed: Nov. 16, 2011

(86) PCT No.: PCT/US2011/060934
§ 371 (c)(1),
(2), (4) Date: Aug. 1, 2013

(87) PCT Pub. No.: WO2012/068216
PCT Pub. Date: May 24, 2012

(65) Prior Publication Data
US 2014/0144848 A1   May 29, 2014

Related U.S. Application Data

(60) Provisional application No. 61/414,129, filed on Nov. 16, 2010, provisional application No. 61/415,988, filed on Nov. 22, 2010.

(51) Int. Cl.
C02F 1/74 (2006.01)
B04C 3/06 (2006.01)
(Continued)

(52) U.S. Cl.
CPC ... C02F 1/74 (2013.01); B04C 3/06 (2013.01); C02F 3/006 (2013.01); C02F 3/22 (2013.01); F04D 29/701 (2013.01); C02F 2209/008 (2013.01); C02F 2209/22 (2013.01)

(58) Field of Classification Search
USPC ................................. 210/614, 620, 739, 220
See application file for complete search history.

(56) References Cited

U.S. PATENT DOCUMENTS

| 4,928,480 A | 5/1990 | Oliver |
| 6,383,389 B1 | 5/2002 | Pilgram et al. |

(Continued)

FOREIGN PATENT DOCUMENTS

| CN | 101289247 A | * 10/2008 |
| CN | 201351590 Y | * 11/2009 |

OTHER PUBLICATIONS

Casler, J. et al., "Cascade Control," https://controls.engin.umich.edu/wiki/index.php/CascadeControl (Oct. 2007).*

Primary Examiner — Chester Barry

(57) ABSTRACT

An aeration system (10) which feeds air to multiple water basins (12) and method. A plurality of local processor based control modules (208) is provided. Each module controls the operation of a compressor unit (11) to effect functions including changes in compressor power level, thermal control and blow-off during compressor start-up. The compressor units (11) are assembled in systems and each system is allocated to a different basin so that no two compressors (22) provide air to the same basin (12). A plurality of control operations are performed with a central processor (300) wherein the central processor directly controls aeration valves 324 in each basin 12 based on monitored oxygen levels.

11 Claims, 15 Drawing Sheets

(51) Int. Cl.
  *F04D 29/70* (2006.01)
  *C02F 3/00* (2006.01)
  *C02F 3/22* (2006.01)

(56) References Cited

U.S. PATENT DOCUMENTS

| | | |
|---|---|---|
| 7,005,069 B2 * | 2/2006 | Shell .......................... 210/604 |
| 7,077,892 B2 | 7/2006 | Lee |
| 7,118,674 B2 | 10/2006 | Dimitriou et al. |
| 7,427,058 B2 | 9/2008 | Galletta, Jr. |
| 7,965,664 B2 * | 6/2011 | Hodson et al. ................ 370/310 |
| 8,372,274 B2 * | 2/2013 | Early et al. ...................... 210/86 |
| 2001/0027948 A1 * | 10/2001 | Tipton et al. ................. 210/629 |
| 2003/0226805 A1 * | 12/2003 | Chi et al. ...................... 210/617 |
| 2006/0045764 A1 | 3/2006 | Thompson |
| 2006/0226068 A1 * | 10/2006 | Hill et al. ...................... 210/610 |
| 2007/0175823 A1 * | 8/2007 | Cheuk et al. ................. 210/614 |
| 2008/0251451 A1 * | 10/2008 | Christian et al. .............. 210/614 |
| 2009/0000586 A1 | 1/2009 | Tonery |
| 2010/0176054 A1 * | 7/2010 | Koopmans et al. ........... 210/629 |
| 2012/0228216 A1 * | 9/2012 | Gavrieli et al. ............... 210/615 |

\* cited by examiner

VORTEX AIR INLET SYSTEM, COMPRESSOR SYSTEM AND RELATED METHOD

This application is the national stage of international application number PCT/US2011/060934 filed 16 Nov. 2011, which in turn claimed benefit of the 16 Nov. 2010 filing date of United States provisional patent application number 61/414,129 and the 22 Nov. 2010 filing date of United States provisional patent application number 61/415,988.

FIELD OF THE INVENTION

The present invention relates to pressurized airflow systems and, more particularly, to systems of the type used in aeration processes.

BACKGROUND OF THE INVENTION

Turbocompressors are primary energy consumers in aeration processes. For example, fifty to seventy percent of the electric power consumed in a waste water treatment plant is attributable to the energy required for aeration. To place this in perspective, it is not uncommon for the treatment of waste water to be thirty five percent of the total energy consumed by a municipality, including street lighting, heating and cooling. It is therefore desirable to find means to improve the energy efficiency and capital costs of treatment processes in general. In the past, the focus of process optimization has been finding ways to improve diffuser technology, blower efficiency and air control.

Optimal processes commonly incorporate fine bubble diffusers, automated control of key parameters and blower designs which incorporate dual inlet and discharge vane control. Energy costs can be reduced by as much as fifty percent with fine bubble diffusers when compared to mechanical or coarse bubble diffusion. This is, in part, due to the fact that finer bubbles provide relatively high surface area which, in turn, results in greater friction with water. In turn, the bubbles rise more slowly, providing greater contact time with the water. Transfer efficiency is increased.

Significant benefits accrue with automated control of dissolved oxygen (DO) concentrations and automated pressure control. Recognizing that DO concentrations are a function of airflow and variable biological oxygen demand (BOD), automated control processes can adjust the DO concentration to optimize energy consumption. Operating a system with excessive header pressure, e.g., by as little as 25 Torr, can increase power consumption by more than five percent. Automated pressure regulation can minimize such pressure excursions to further improve operating efficiencies.

In single stage blower designs which incorporate dual inlet and discharge vane control, control processes can be applied for independent management of the flow and head functions. The flow function can be managed through discharge control vanes and the head function can be managed via control of inlet guide vanes. This enables a relatively high operating efficiency over a relatively wide range of flow rates and temperature conditions.

Despite opportunities for realizing potentially large energy economies with the afore described technologies, there is a continued need to find additional means for improving operating efficiencies and to reduce capital expenses of treatment plants.

BRIEF DESCRIPTION OF THE DRAWINGS

The following detailed description of the invention will be best understood when read in conjunction with the drawings, wherein.

Like reference numbers are used to denote like features throughout the figures.

DETAILED DESCRIPTION OF THE INVENTION

Figure 1A:
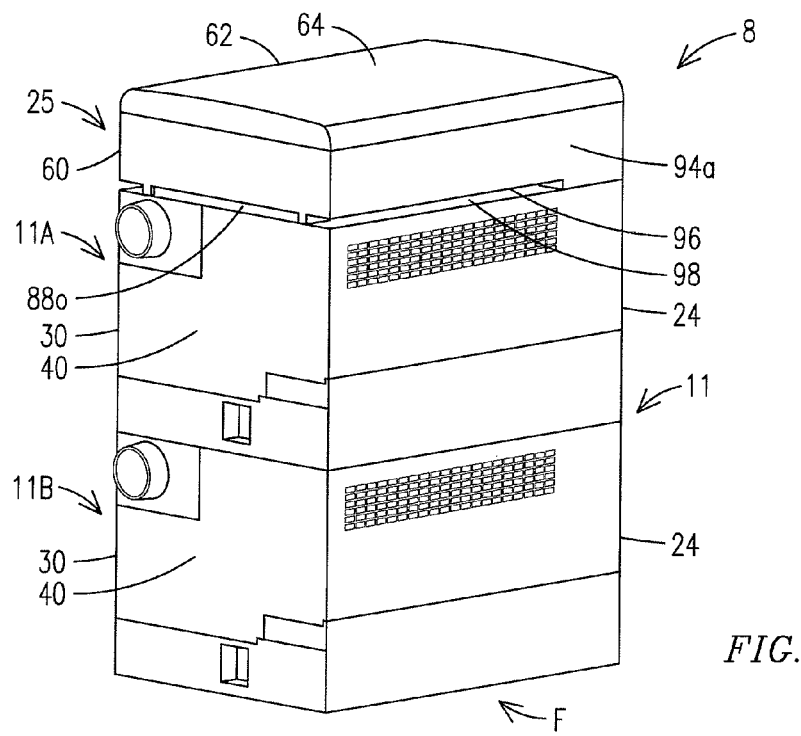
FIG. 1A is a perspective view of the exterior of a compressor system comprising multiple compressor units according to an embodiment of the invention, the system having an air inlet system positioned over upper and lower compressor units.
Figure 2:
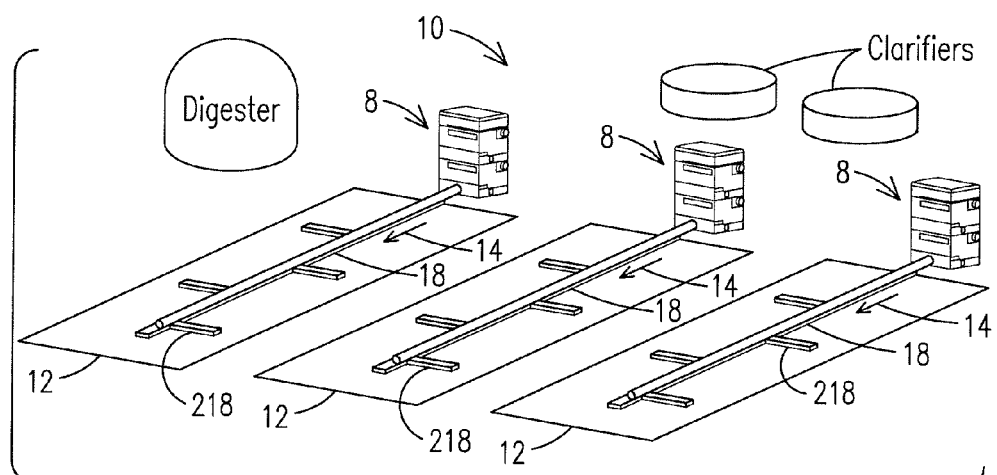
FIG. 2 illustrates a Waste Water Treatment Plant according to an embodiment of the invention which system incorporates multiple ones of the compressor systems shown in FIG. 1.

With reference to FIGS. 1A-1E, there is shown a compressor system 8 of the type which provides aeration in a Waste Water Treatment Plant (WWTP) system. An exemplary implementation of a portion of a WWTP system 10 according to an embodiment of the invention is shown in FIG. 2. In addition to clarifiers, digesters and other conventional equipment, the system 10 includes a distributed aeration system in which multiple aeration basins 12 each receive an airflow 14 generated by a different compressor system 8 via an associated header 18. With a compressor system 8 allocated as shown to each basin, the rate of airflow into each basin 12 is individually determinable by the output of each compressor system 8. A feature of the illustrated embodiment is that each compressor system 8 may comprise one, two or more compressor units 11 based on modularity. This arrangement where a WWTP system may have one compressor system 8 allocated as shown to each basin is in lieu of a plant-wide delivery system of the type having a manifold through which air is delivered to all of the basins in a WWTP system. It is conventional to distribute compressed air for all basins from a single location which houses multiple large compressors. The conventional systems include a centralized valve control system that adjusts the air distribution relative to each basin.

Figure 12:
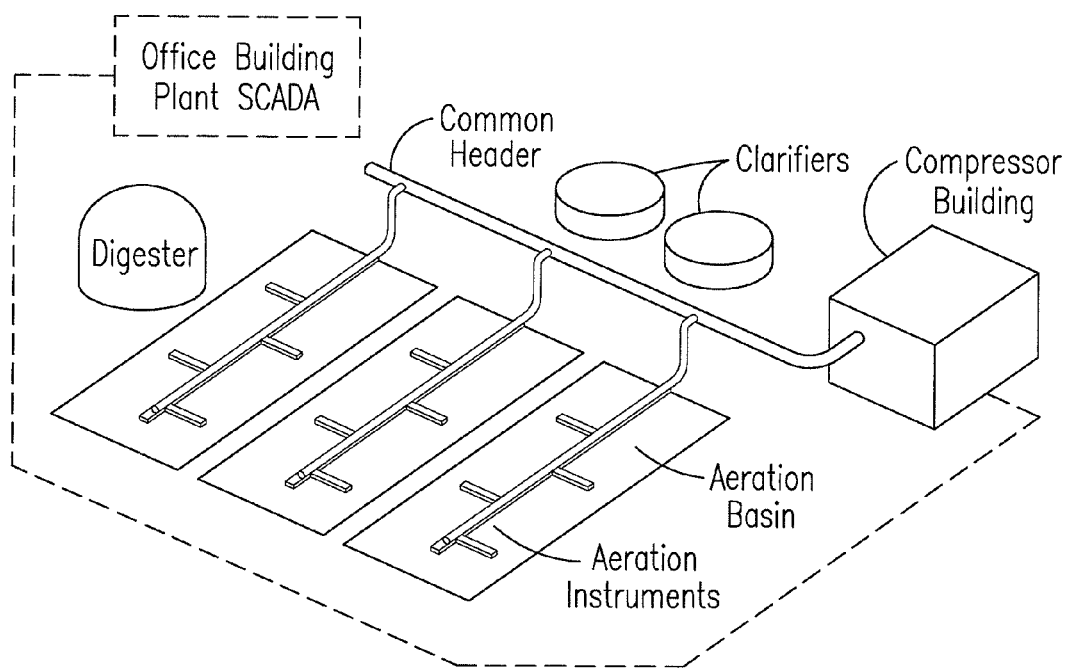
FIG. 12 is a prior art illustration of a Waster Water Treatment Plant.

In this regard, see the WWTP system of FIG. 12, in which a building houses several relatively large air compressors that collectively generate the entire volumetric flow of the WWTP system and deliver the air to all of the basins in the plant via a common header. In such systems it is conventional to take in ambient air from outside the building into a single filter system before distributing the air to each of the compressors. The airflow output from the numerous compressors operating in the building is then merged into a primary distribution line which carries the high pressure air to the header pipe. For purposes of efficiency and economy, a series of valves under the direction of a central control unit adjust the air distribution among each of several branch lines which extend into the basins where connection is made to aeration lines 218.

Notably, the compressor systems 8 may be relatively small compared to those housed in the conventional compressor building of FIG. 12. According to an embodiment of the invention, the compressor systems 8 comprise modular units and are suitable for operation in an outdoor environment. The system 8 can be configured to withstand high wind loads, hurricane weather and earth tremors while protecting the rotating equipment and electronics housed within. With a stacking arrangement the units consume a relatively small footprint.

The molding process can incorporate supports which facilitate the stacking function and provide sufficient anchoring of one unit to another unit, resulting in a stable structure. Each unit may be formed of plastic to provide durable, stackable components suitable for in an outdoor environment. Alternately the units may be formed of metals, e.g., steel, but at greater cost and with susceptibility to corrosion. Each system 8 may be positioned in close range of the basin 12 to which the system 8 supplies air under pressure, thereby reducing air pressure losses. Each compressor unit in a system 8 includes an electric motor drive system which generates, for example, 200 to 400 horse power. The number of compressor units in a modular system 8 may depend on the number of basins 12 to which airflow is delivered from a single system 8 and the size of each basin 12.

Figure 1B:
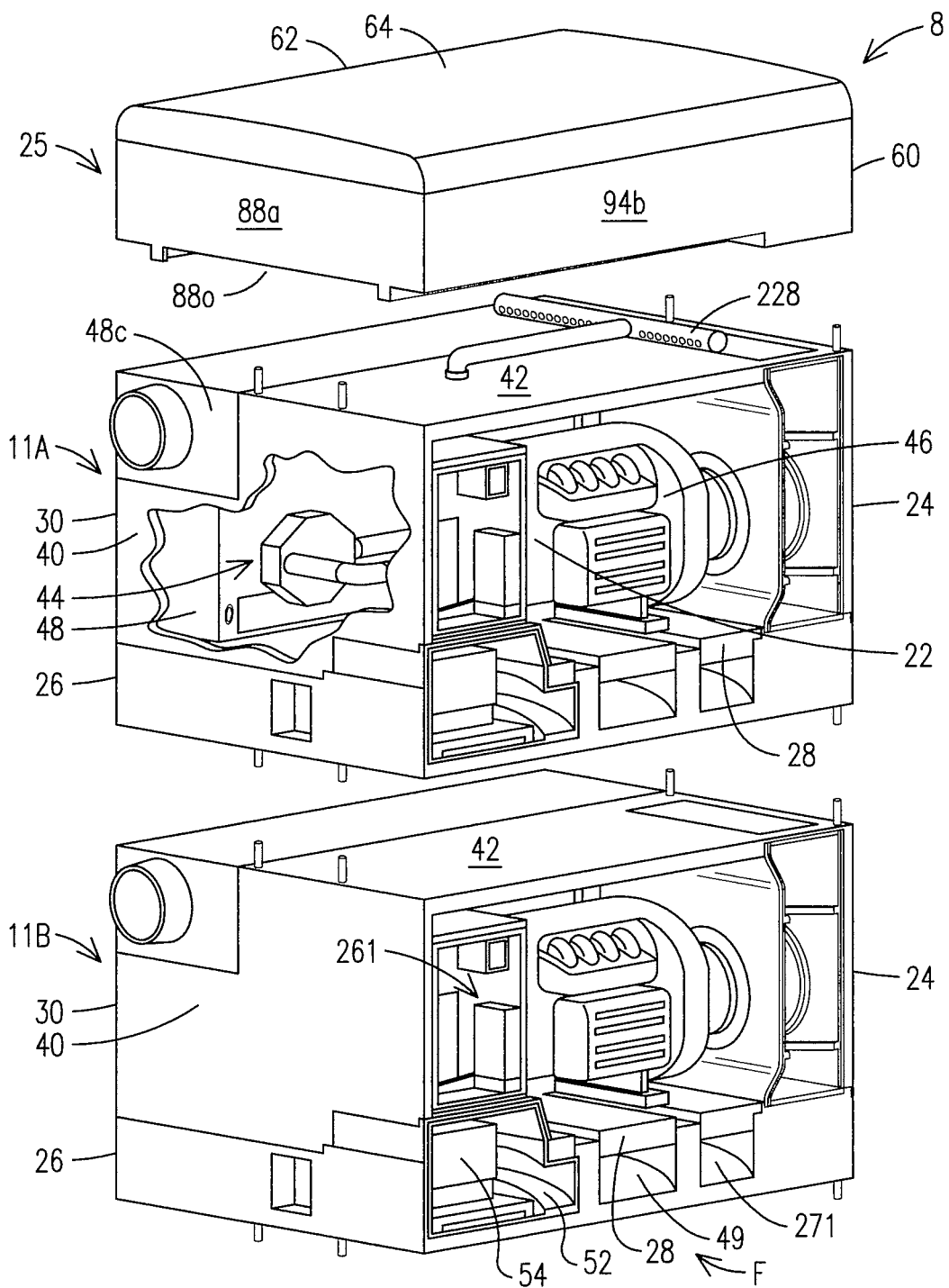
FIG. 1B is an exploded view of the system shown in FIG. 1A illustrating the air inlet system and interior portions of the upper and lower compressor units.
Figure 1C:
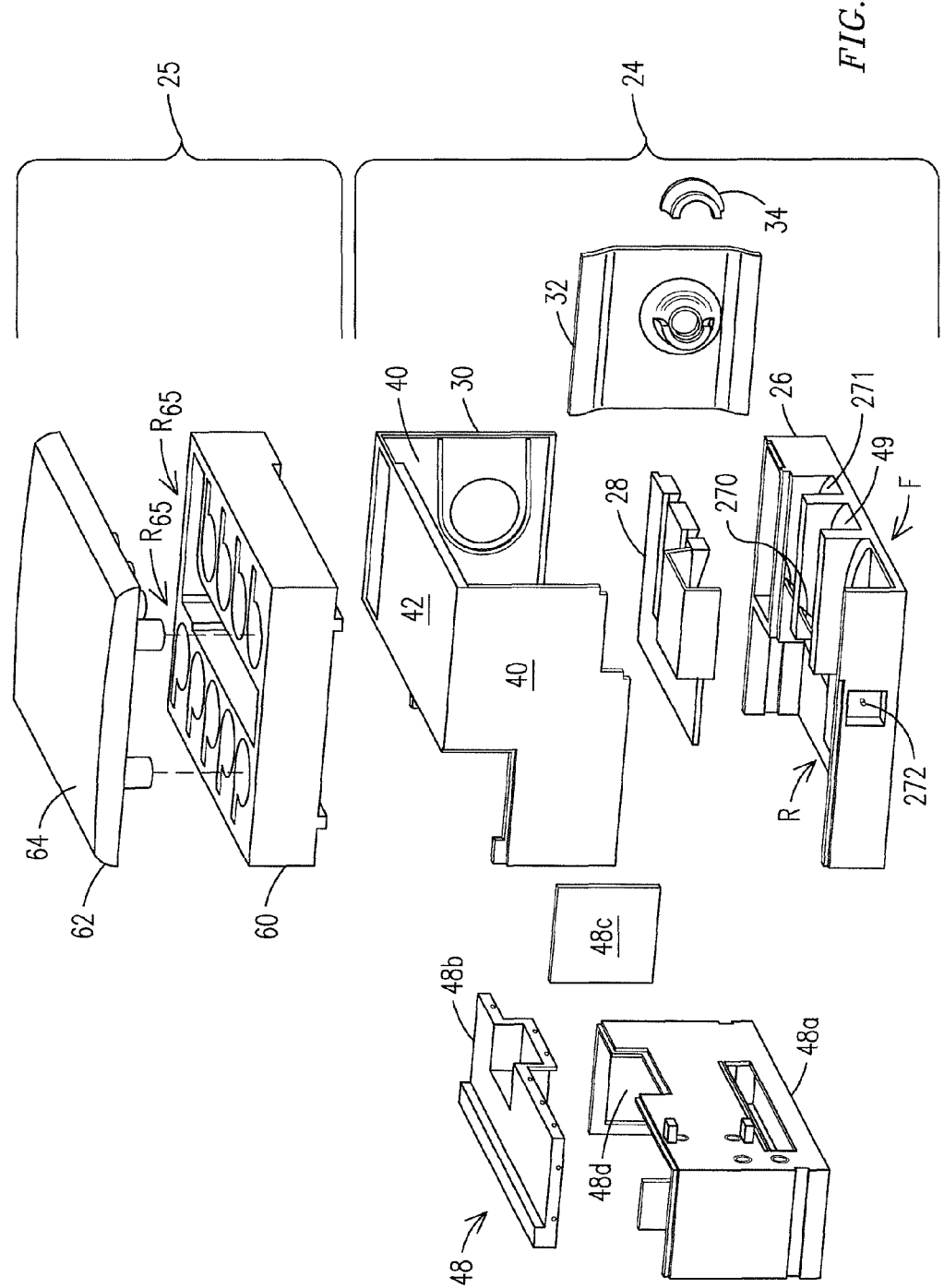
FIG. 1C is a further exploded view of the compressor system shown in FIGS. 1A and 1B illustrating details of the air inlet system and a compressor housing unit.

As shown in the exploded views of FIGS. 1B and 1C, the exemplary modular system 8 comprises a series of vertically stacked units which include multiple compressor units 11. In this example, each compressor unit contains a single compressor 22 secured within one modular chassis housing 24. Two or more compressor units can be stacked one over another. The described embodiment of the compressor system 8 includes two compressor units 11, the units referred to in the figures as an upper unit 11A and a lower unit 11B. The exploded view of FIG. 1C is a partial view of the system 8, illustrating components of a compressor chassis housing 24 and an air inlet system 25 positioned above a chassis housing. The illustrated housing 24 is representative of the housing in which the compressor 22 and other components of each unit 11A and 11B are mounted.

The exemplary chassis housing 24 includes a base 26, shown in a horizontal orientation with respect to a ground plane, an air compressor platform 28 and a housing frame 30. A major surface of the platform 28 is horizontally positioned over the base 26 and along a forward side, F, of the base to support the weight of an air compressor 22. The housing frame 30 comprises a series of vertical side wall portions 40 and an integrally formed upper cover plate 42 which enclose the compressor 22. As shown in FIG. 1A, the sidewall portions may include operable doors or removable panels to provide access to equipment within the housing frame 30. A bell mouth panel 32 is positioned for coupling with the intake of a compressor 22 and fixation with a clamp 34, resulting in connection through an optional air filter to receive intake air.

The system 8 also includes a refrigeration system 44 which cools components of the compressor, e.g., an impeller section 45, a compressor motor 46 of the type having a rotor and a stator, and electronic components. See FIGS. 1D and 1E and FIG. 5. The refrigeration system 44, also enclosed within the housing frame 30, includes numerous conventional components not shown in the figures, e.g., a refrigerant compressor, a condenser unit, a fan system and refrigeration lines which extend about the drive system components. Several components of the refrigeration system, such as the evaporator and compressor, are located in a refrigeration housing 48 positioned along a rear side, R, of the base 26. The housing 48 has a sidewall enclosure 48a and a cover 48b which fits over the sidewall enclosure. A panel 48c covers an opening 48d in the sidewall enclosure 48a that provides access to the system 44 for maintenance and repair.

Figure 1D:
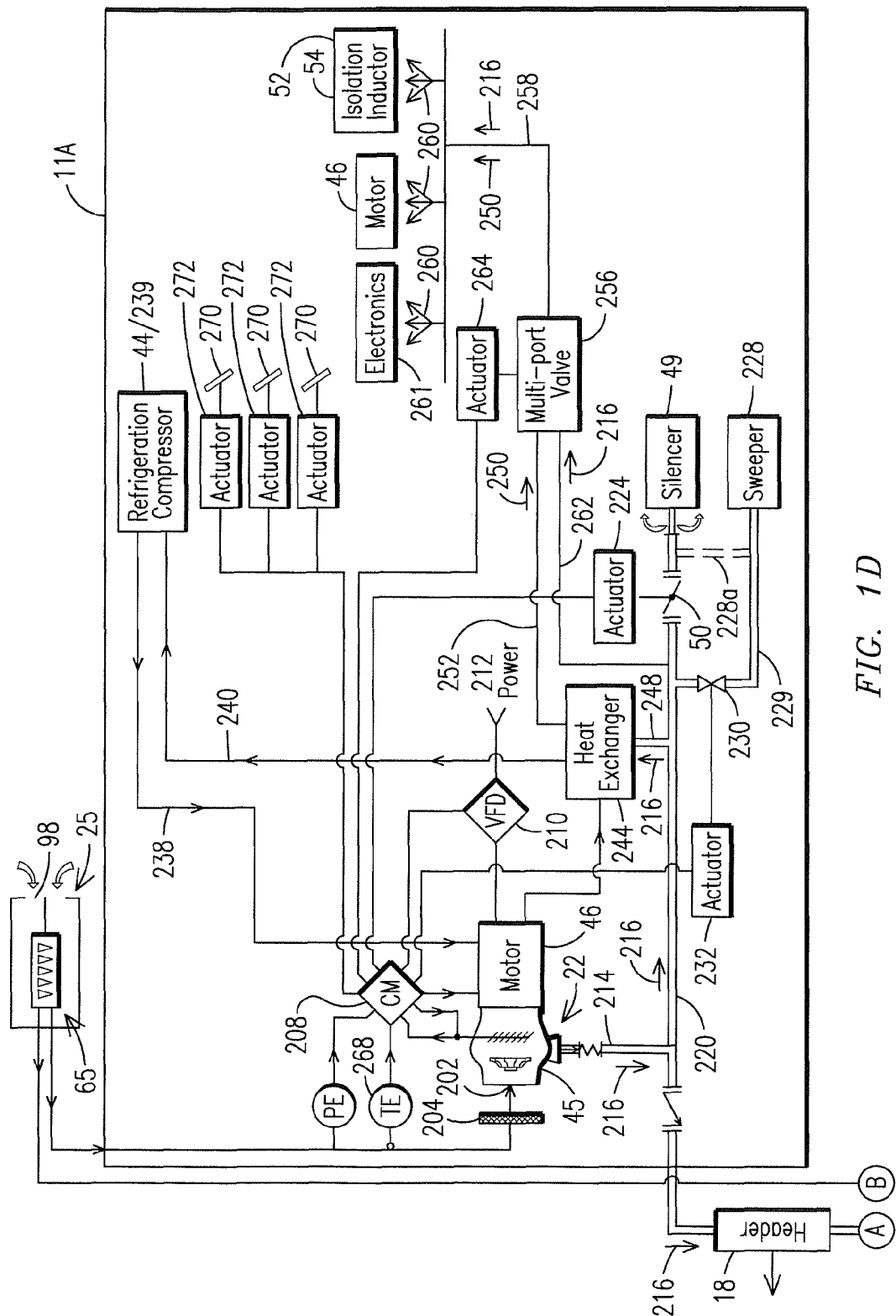
FIGS. 1D and 1E are a schematic illustration of components in the compressor system shown in FIGS. 1A-1C, including a cooling and heating system according to a first embodiment of the invention.
Figure 1E:
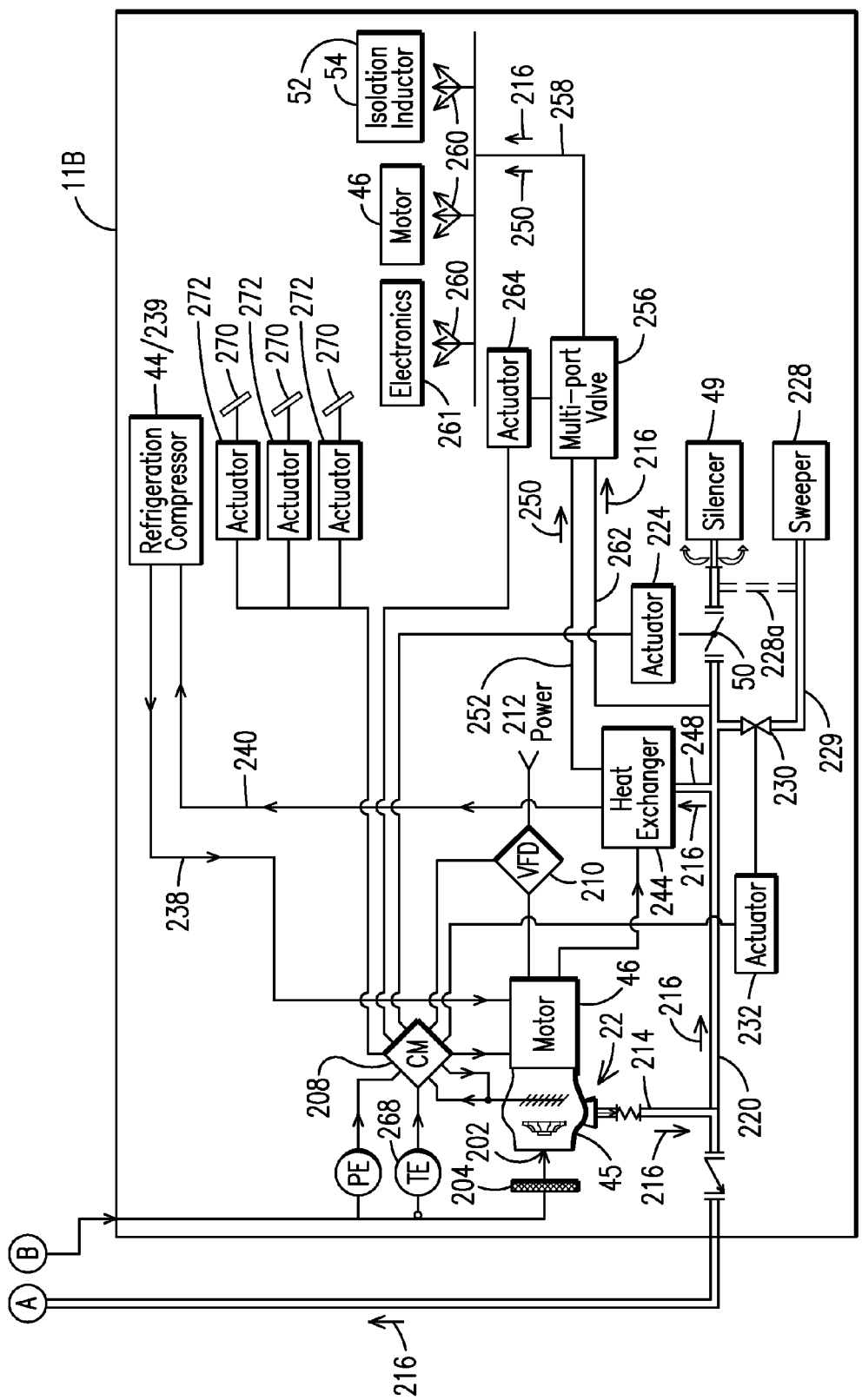
Figure 3A:
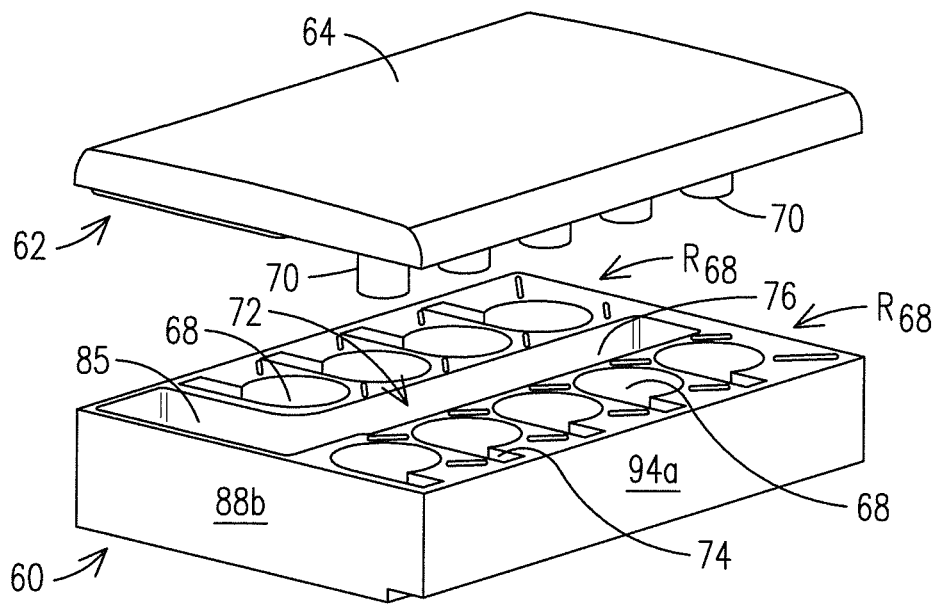
FIGS. 3A-3D are a series of perspective views of a plenum unit and a vortex body unit of the air inlet system shown in spaced apart relation.
Figure 3B:
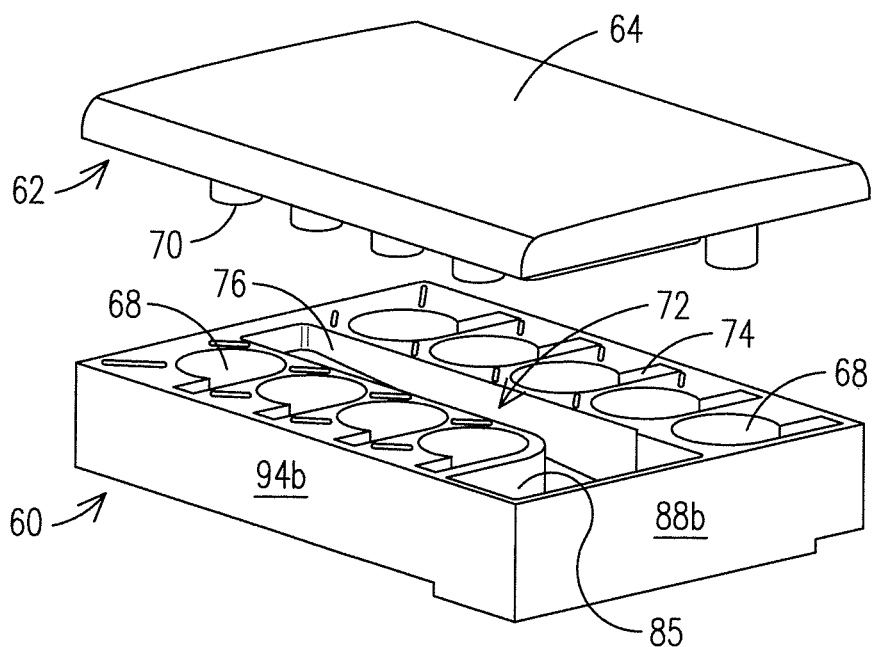
Figure 3C:
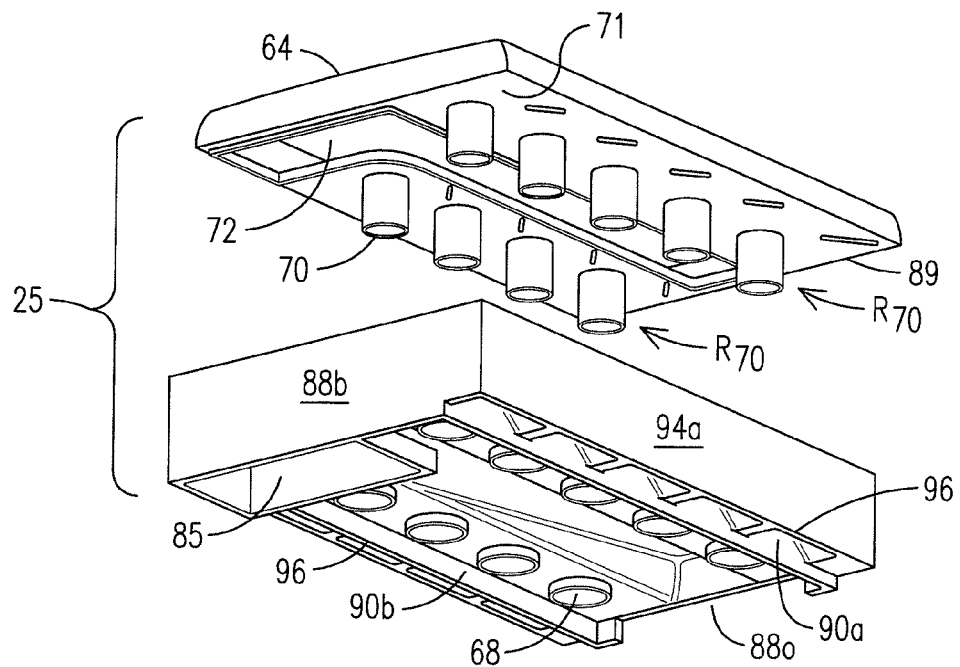
Figure 3D:
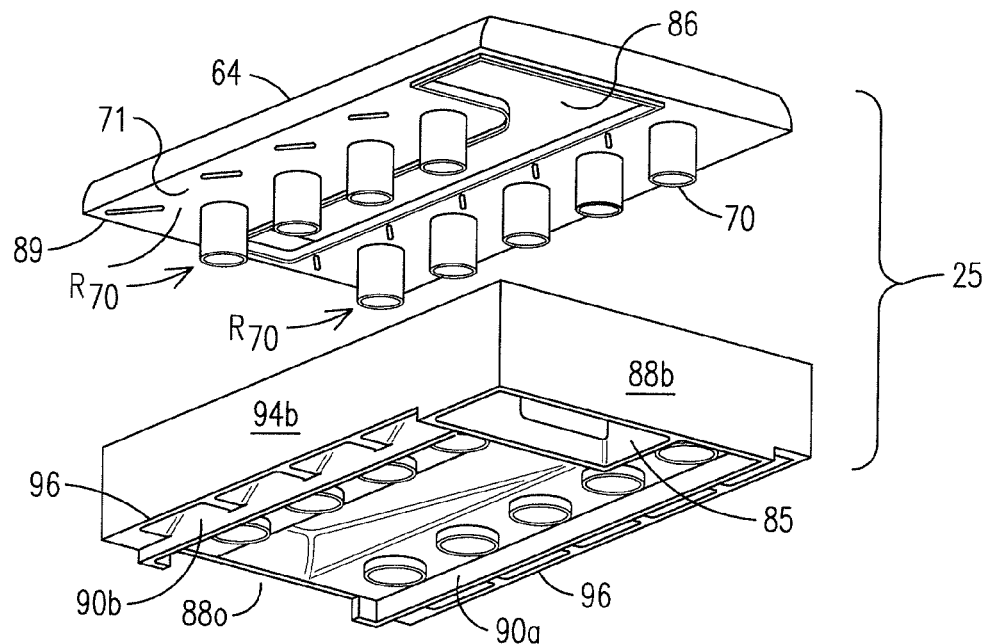

With the compressor platform 28 positioned against the base 26, a channel path along the base forms a water blow-off duct 49, immediately beneath the compressor platform 22. See FIG. 1C. The duct 49, used in conjunction with a blow-off valve 50, shown in FIGS. 1D and 1E, is used to vent compressed air during compressor start-up to limit the rate of line pressure build-up as water is evacuated from the aeration lines 218. The blow off duct 49 also serves as an air silencer. As shown in FIG. 1B, the compressor platform 28 extends along the base 26 to enclose a compartment 52, along the forward side, F, of the base and behind the compressor motor, which houses an isolation inductor 54.

The air inlet system 25 is positioned above the chassis housings 24 to provide an intake air stream to the compressors 22 while also removing large or heavy particulate matter from ambient air delivered to the compressors 22. A feature of the system 25 is removal of such particulate matter from incoming air without use of a conventional porous filter material. The air inlet system 25 functions as a particle filtration system based on principles of cyclonic separation. FIGS. 3A-3D are perspective views of two components of the air inlet system 25 shown in spaced apart relation. As illustrated in FIG. 1, the air inlet system 25 includes a lower vortex body unit 60 positioned over the upper cover plate 42 of the upper chassis housing 24A, and a clean air plenum unit 62 positioned over the vortex body unit 60. The plenum unit 62 includes an upper surface or cover layer 64 providing an exterior weather resistant cover to the system 8. The combination of the units 60 and 62 forms an array consisting of two spaced-apart rows $R_{65}$ of classical cyclone separators 65.

The illustrated design of the cyclone separators 65 is exemplary, it being understood that multiple designs for individual cyclone collector bodies are known. Further, the design of the air inlet system as now described, including the particular array design and specific air flow patterns for air intake, particle removal and flow of clean air to each compressor are also exemplary. In the illustrated example, the plenum unit 62 is positioned over the vortex body unit 60 so that each vortex finder tube 70 extends into a cyclone body 68.

Each cyclone separator 65 in the array comprises a cyclone body 68, a vortex finder tube 70 and an air intake duct 74 for receiving ambient air into the cyclone separator 65 for removal of particulate matter. See, also, FIGS. 5 and 6. The vortex body unit 60 contains an array of the cyclone bodies 68 arranged in two exemplary spaced-apart rows, $R_{68}$. The plenum unit 62 contains an array comprising two spaced-apart rows $R_{70}$ of the vortex finder tubes 70 which each receive air from a cyclone body 68 in the vortex body unit 60. The tubes 70 are formed along a lower plenum surface 71.

A major portion of the lower surface is spaced apart from the upper surface 64 providing a first open region 73. Ambient air flows from the cyclone bodies 68 through the tubes 70, into the first open region 73. The open region 73 is bounded by the lower plenum surface 71 and the upper surface or cover layer 64. The surface 64 includes portions which extend to meet the lower surface 71 and enclose the otherwise region 73 from the ambient environment. In the illustrated embodiment the surfaces 64 and 71 are integrally formed in, for example, a plastic molding process.

Initially the cleaned airflows from the tubes 70 through a subregion extending between upper and lower plenum surfaces 64, 71 and then, generally between the two rows of cyclone separators 65. More specifically, with the rows $R_{70}$ of finder tubes 70 in spaced-apart relation, air exiting the tubes 70 can flow along and between the two spaced-apart rows $R_{70}$ of vortex finder tubes between the two spaced-apart rows $R_{70}$.

Figure 4:
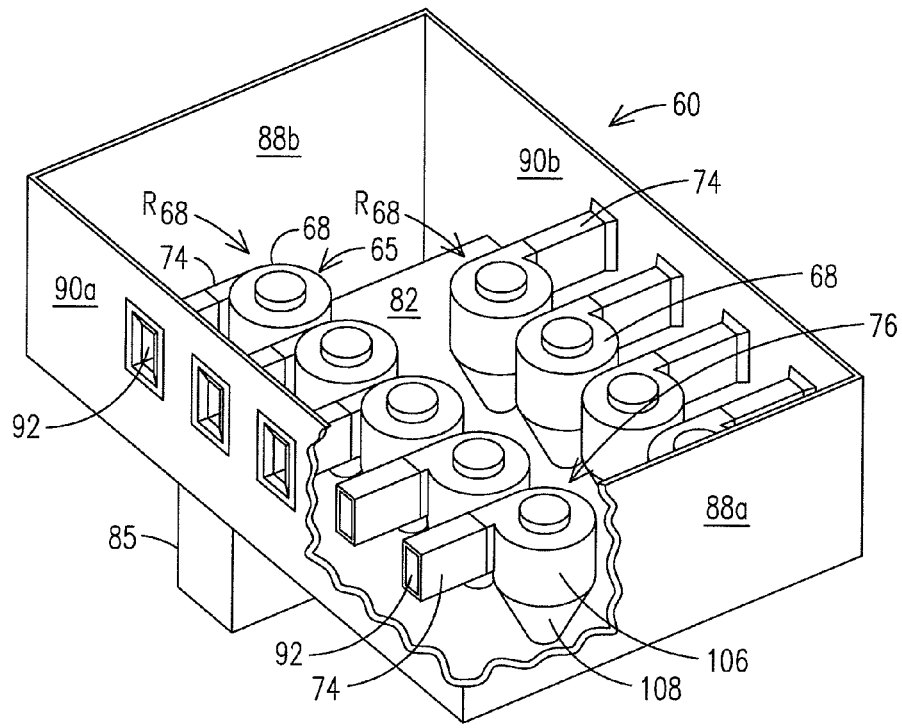
FIG. 4 is a partial perspective view of a vortex body unit of the air inlet system shown in FIG. 1, illustrating interior portions of the unit.

A partial cut-away interior view of the vortex body unit 60 is shown in FIG. 4. The unit includes a second open region 76 extending over a lower base plate 82 of the unit. The second open region 76 is bounded by the lower base plate 82, first and second pairs of opposing sides of the vortex body unit 60 and the plenum unit 62. When assembled over the chassis housing unit 24A, the lower base plate 82 is positioned above the chassis housing 24 of the upper compressor unit 11A and in spaced-apart relation to the upper cover plate 42 of the chassis housing unit. For purposes of illustrating features of components according to the invention, the cyclone bodies 68 are shown in the cut-away view of FIG. 4 as individually formed elements but it is to be understood that, in accord with the embodiment as illustrated in other figures, they are integrally formed with one another and with other portions of the vortex body unit 60. See FIG. 3.

When the clean air plenum unit 62 is positioned over the vortex body unit 60, the first and second open regions 73 and 76 come together and form a clean air chamber 84. The chamber 84 extends along and between the two spaced-apart rows $R_{68}$ of cyclone bodies 68. The cyclone bodies 68 extend from the lower base plate 82 to the lower surface 71 of the plenum unit 62 and the finder tubes 70 extend from the lower surface 71 into the cyclone bodies 68. Cleaned air exiting the finder tubes 70 generally passes between the two rows of cyclone separators 65 in the chamber 84.

Opposing sides 88a, 88b of the first pair bound ends of the rows $R_{68}$ of cyclone bodies 68. The side 88a extends from a sealing edge surface 89 along the plenum unit 62 toward the lower base plate 82 but not contacting the lower base plate in order to provide an air flow opening 88o along the base plate 82. The side 88b extends fully from the lower base plate 82 to the sealing edge surface 89 along the plenum unit 62.

The second pair of opposing sides consists of air intake panels 90a, 90b which each also extend fully from the lower base plate 82 to the lower surface 71 of the plenum unit 62. Each of the air intake panels 90a, 90b includes a row of ports 92 which extends along the direction of one of the two rows $R_{68}$ of cyclone bodies 68 to provide air to all of the cyclone bodies 68 in the row $R_{68}$ adjacent the intake panel. Each port 92 is in fluid communication with ambient air outside of the vortex body unit 60 and with an open end of an air intake duct 74 of one cyclone body 68. This provides a flow path for the ambient air to enter each of the bodies 68 of the cyclone separators 65.

Figure 5:
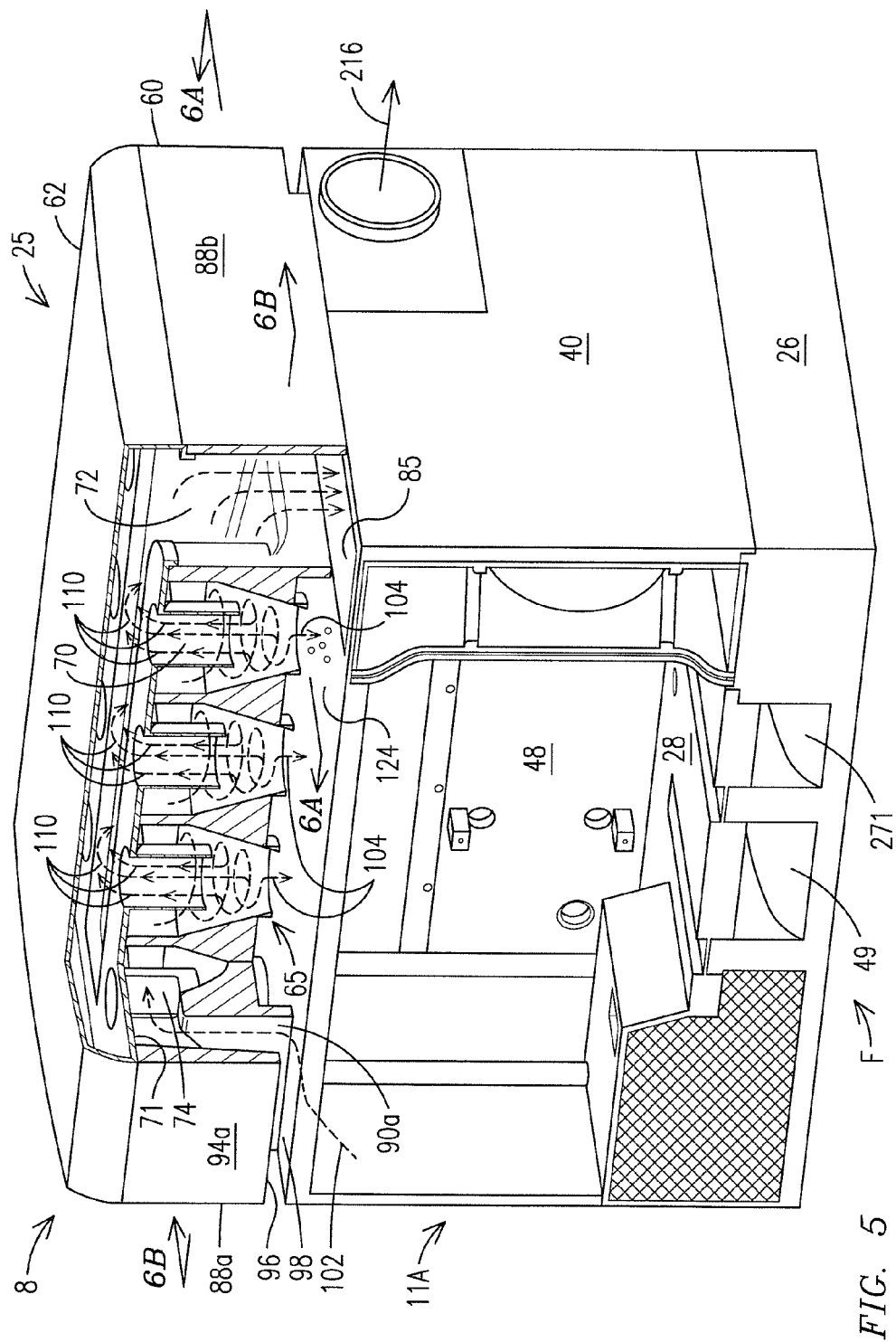
FIG. 5 is a cut-away perspective view of a portion of the compressor system shown in FIG. 1, illustrating an air inlet system positioned over an upper chassis housing unit.

The exterior of the vortex body unit 60, shown in the cut-away partial perspective view of FIG. 5, is also of a generally rectangular-like shape, with the first pair of opposing sides 88a, 88b serving as exterior walls of the unit 60. The unit includes a second pair of opposing exterior side walls which serve as air intake cover panels 94a, 94b, each positioned next to and in spaced-apart relation to one of the air intake panels 90a, 90b. Each cover panel 94a, 94b is positioned along one of the two rows $R_{68}$ of cyclone bodies 68 and, as shown in the figures, may be in a plane parallel with one of the air intake panels.

The cover panels 94a, 94b each extend from above the upper cover plate 42 of the upper chassis housing unit 24A to the plenum unit 62. When the unit 60 is installed over a chassis housing 24, a lower edge 96 along each of the cover panels 94a, 94b is spaced away from the upper cover plate 42 of the upper chassis housing unit 24A. This leaves an opening 98 between the outside ambient environment and each row of ports 92 formed along the intake panels 90a, 90b. The cover panels thus provide the air intake panels 90a, 90b and the ports 92 with a level of isolation from the elements while permitting free flow of air into the system 8 to operate the compressors 22 in each housing 24. As indicated by the arrow 102, air enters the assembly 25 through the opening 98, travels upward and between an intake panel and a cover panel (90a, 94a), (90b, 94b) to enter each of the cyclone bodies 68 through an air intake duct 74.

Figure 6A:
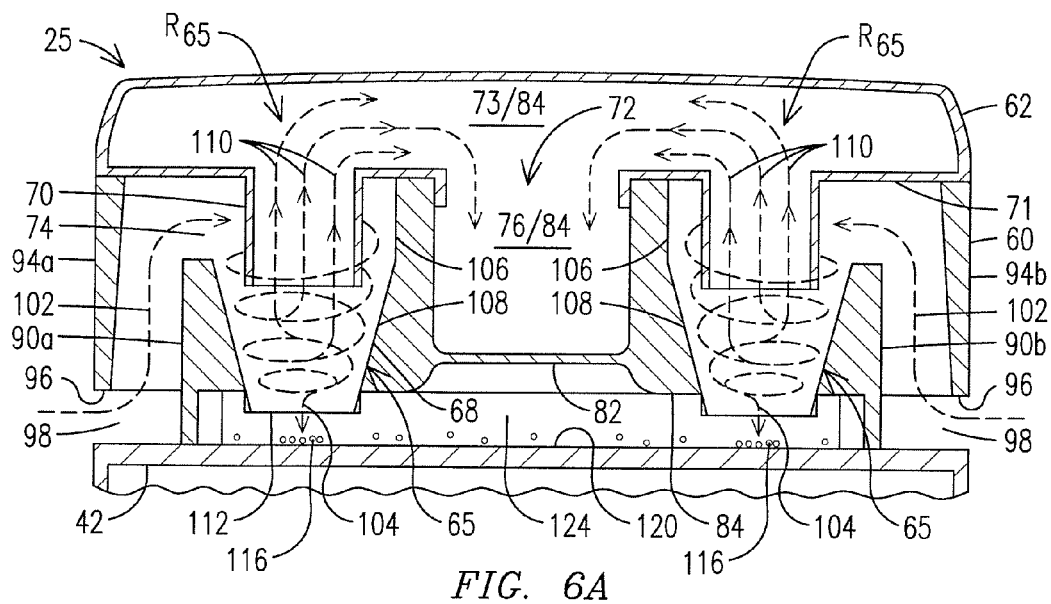
FIG. 6A is a view in cross section of an air inlet assembly 25 taken along line 6A-6A of FIG. 5.
Figure 6B:
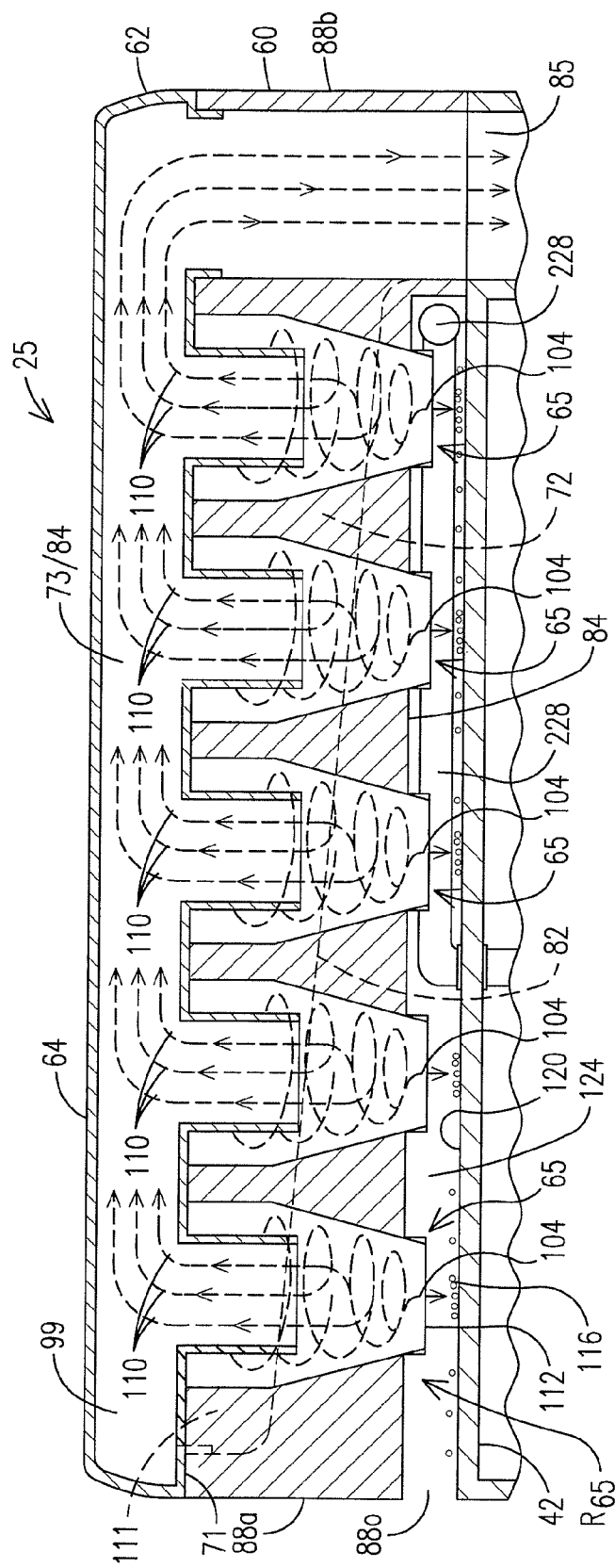
FIG. 6B is a view in cross section of the air inlet assembly 25 taken along line 6B-6B of FIG. 5.

FIG. 6A is a view in cross section of the air inlet assembly 25 taken along line 6A-6A of FIG. 5 and through two cyclone separators 65 in different rows $R_{65}$. FIG. 6B is a view in cross section of the air inlet assembly 25 taken along line 6B-6B of FIG. 5 and through a row $R_{65}$ of five cyclone separators 65. FIG. 6 illustrate flow of air in the cyclone separators 65 followed by movement of clean air through the plenum unit 62 and particle collection on the upper cover plate 42 of the chassis housing 24 of the upper compressor unit 11A. FIG. 6 also further illustrate movement of air through the cyclone separators 65 and the clean air chamber 84. As indicated by the arrow 104, air entering each cyclone body 68 from an intake duct 74 undergoes a downward cyclic movement within the body 68. Initially, air received from a duct 74 enters an upper cylindrically shaped segment 106 of a body 68 and then migrates to a lower conically shaped segment 108.

As further indicated by a series of arrows 110, a majority of the descending air subsequently follows an upward flow path. A portion of the descending air passes through an opening 112 in the bottom of the conical segment 108, as indicated by arrow 114, carrying particulate matter 116 through the opening 112 as well. The air following the upward flow path in each cyclone separator 65, as indicated by the arrows 110, enters the associated vortex finder tube 70 and transitions into the first open region 73 of the plenum unit 62. The second open region 76 of the vortex body unit has a tapered geometry defined by a slope present in the base plate 82. With the clean air duct 85 formed at one end of the second open region 76 (adjacent the side 88b), the area in cross section of the clean air chamber increases from a minimum area along the side 88a adjoining the chamber to a maximum area near the duct 85, thereby accommodating increased volumetric air flow at positions closer to the duct 85. Air received into the clean air chamber 84 from the rows of finder tubes exits through the duct 85 to the compressors 22 in the underlying housing units 24A, 24B.

As shown in the views of FIG. 6, the lower conical segments 108 of the cyclone bodies 68 terminate on the base plate 82 with the cyclone body openings 112 providing a path through the plate 82 for downward movement of the particulate matter 116 into a particle collection region 124 in which an upper surface 120 of the upper cover plate 42 serves as a collection tray. Also referring to FIGS. 1D and 1E, which illustrate features of the compressor system 8 in schematic form, the air inlet system 25 receives ambient air through openings 98 along the panels 90a, 90b. Incoming air travels a flow path through the cyclone separators 65 for particle removal. Cleaned air then progresses through the afore-described chamber 84, the clean air duct 85 and other flow passages to enter air inlets 202 of the compressors 22. FIGS. 1D and 1E illustrate features of the compressor units 11A and 11B. In the example embodiment the unit 11B has identical features to those of the unit 11A.

An optional filter 204 is positioned in line to remove relatively small particulate matter not removed from the ambient air by the system 25 prior the air reaching the compressor air inlets 202. A module 208 monitors and controls operation of the compressor 22, and provides signals to a variable frequency device (VFD) 210 positioned in line between an input power source 212 and the motor 46 to selectively adjust the motor drive speed of the compressor 22. The control module may be a programmable microprocessor.

A flow line 214 carrying compressed air 216 output from the compressor 22 merges into a header 18 which also receives compressed air from the unit 11B to supply the air flow 14 air to a basin 12 as illustrated in FIG. 2.

When the compressors are shut down, air lines 218 extending from the headers 18 and into the basins normally take in water from the basin. To avoid damage to components connected to the air lines 218 during start-up of the compressors 22, a portion of each compressor output is diverted from each flow line 214 to a bypass line 220 which exhausts the air through the blow off duct 49. Diversion of compressed air 216 output into the bypass line 220 is regulated by the blow-off valve 50 to limit the rate of line pressure build-up while water is being evacuated from the air lines. An actuator 224 operatively coupled to the valve 50 receives signals from the control module 208 to selectively position the valve 50 for diversion of the compressed air 216.

In addition to having a pressure relief connection via the valve 50, the bypass line 220 also connects compressed air 216 in the flow lines 214 to an air sweep 228 positioned on or along the upper cover plate 42 of the upper compressor housing unit 24A. The sweep 228 receives compressed air 216 via a branch line 229 connected to the bypass line 220. Diversion of compressed air 216 from the bypass line 220 into the branch line 229 may, as shown in the figures, be regulated by a self cleaning valve 230. A second actuator 232 operatively coupled to the valve 230 receives signals from the control module 208 to position the valve for diversion of the compressed air 216 into the air sweep 228. In an alternate configuration (shown with phantom lines), instead of providing the line 229 and valve 230, the air sweep may receive compressed air from the line 220 at a point downstream of the valve 50 via an alternate line 228A so that compressed air is sent through the air sweep 228 whenever the blow off valve is opened, e.g., to exhaust compressed air through the blow off duct 49. In either configuration the module 208 controls the sweep which may occur with a regular frequency or simply when the valve 50 is opened, e.g., during start-up of the compressor unit. In this regard, with the system 8 programmed for energy efficiency, one of the compressor units 11A or 11B may be brought on line intermittently and cycle more frequently than the other unit which could be running continuously.

Figure 7:
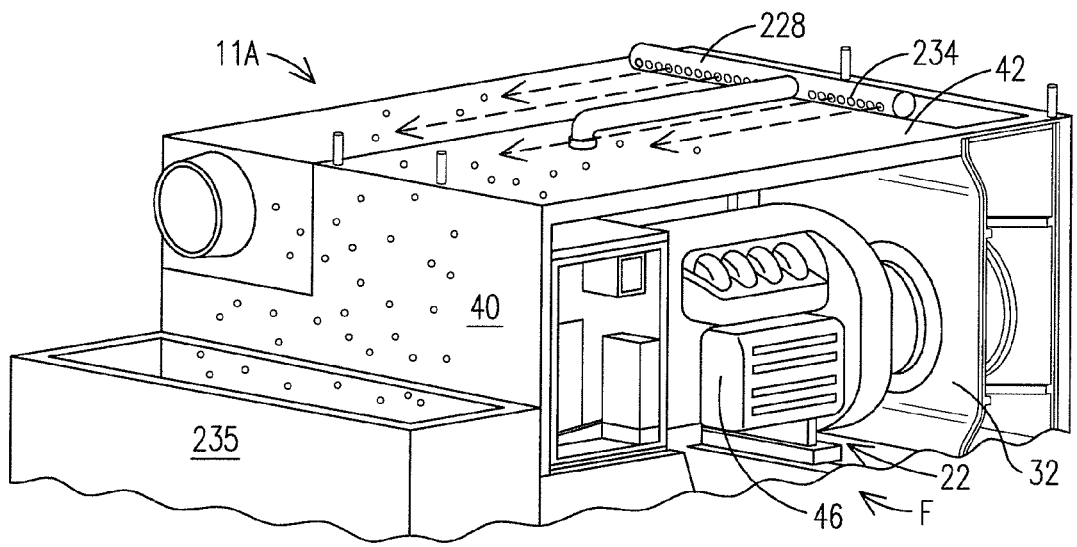
FIG. 7 is a partial cut away view of the system shown in FIG. 1 illustrating components of an air sweep.

The air sweep 228 is positioned on the compressor unit 11A along the side 88b of the vortex body unit 60 to provide a stream of air for moving particles or other debris. As shown in FIG. 7 the exemplary sweep 228 may be a straight tubular body which receives and emits air from the compressor 22. It is shown positioned along the surface of the cover plate 42, parallel to the side 88b of the vortex body unit 60. A row of orifices or jet nozzles 234 are positioned along the sweep to send bypassed compressed air 216 along the upper surface of the upper cover plate 42 in a direction toward the side 88a of the vortex body unit 60 and through the air flow opening 88o. The movement of the compressed air across the base plate carries particulate matter, which has fallen on to the cover plate from the openings 112 of the cyclone separators 65, through the opening 88o along the base plate 82 thereby cleaning the cover plate of debris. The debris may be deposited in a container 235.

With further reference to FIGS. 1D and 1E, there is shown an embodiment wherein each compressor unit 11 in the system 8 includes a thermal control subsystem comprising the refrigeration system 44 and a heating system each under the control of the module 208 which is responsive to temperature conditions within or outside the system 8. The refrigeration system 44 provides cooling to compressor components, including the stator of the motor 46 and other electrical components. Generally, cooling is effected by circulating refrigerant through temperature sensitive components and generating cooling air which is channeled along surfaces of components.

The refrigeration system 44 provides a first cooling line 238 which carries cold refrigerant from a refrigeration compressor 239 located in the refrigeration housing 48 to the motor 46 for circulation therethrough. A second cooling line 240 carries cold refrigerant to a heat exchanger 244 which receives hot compressed air 216 from a second branch line 248 connected to the bypass line 220. The heat exchanger 244 cools the compressor air 216. Relatively cold compressor air 250 output from the heat exchanger 244 is output on a cold air line 252 which passes through a first inlet port of a multi-port valve 256. Output from the valve 256 is via a line 258 which delivers the cold air 250 to cool moving components of the compressor 22 and electrical components associated with motor operation. For example, with the temperature of compressor air 216 in the range of 130° F. (55 C), a flow of chilled compressor air 250 can be directed about the air intake 202 and the impeller section 237 of the compressor 22 through orifices 260, through the compartment 52 which houses the isolation inductor 54 and along other electronics 261 associated with the compressor motors 46.

The heating system 236 of the thermal control subsystem is integrated with lines of the refrigeration system. A third branch line 262, coupled to receive hot compressed air 216 from the bypass line 220, is also connected to the delivery line 258 through a second port of the valve 256. An actuator 264 which receives signals from the module 208 controls the position of the valve 256 to either deliver cold air 250 or hot compressor air 216 through the delivery line 258 to the compressors 22, the compartment 52 and inductor 54 and the other electronic components.

The control module 208 periodically senses ambient temperature conditions and/or temperature conditions internal to the system 8 with thermal sensors 268. When the temperature is above a first predetermined set point, $T_1$, the control module 208 sends a signal to the actuator 264 which sets the valve 256 to transmit cold air 250 through the delivery line 258. When the temperature falls below a second predetermined set point, $T_2$, the control module sends a signal to the actuator 264 which sets the valve 256 to transmit relatively hot compressor air 216 through the delivery line 258. The blow-off duct 49 and other openings, e.g., an adjoining channel 271 and the compartment 52, are open to the ambient environment to vent air carried through the delivery line 258 and transmitted through the orifices 260. In order to improve heat transfer to system components during cold temperature conditions, these openings are fitted with dampers 270. See FIG. 1C. The dampers 270 can be adjusted by one or more actuators 272 under the control of the module 208. When the temperature falls below the second predetermined set point $T_2$, the control module 208 sends a signal to the actuator 264 to adjust the valve 256 to block flow of chilled air 250 and transmit relatively hot compressor air 216 through the delivery line 258.

At the same time or shortly after the valve 256 is set to transmit relatively hot compressor air 216, the control module 208 sends a signal to the one or more damper actuators 272 to adjust the dampers 270 and thereby reduce the rate at which compressor air flows out of the blow-off duct 49 and other openings, e.g., an adjoining channel 274 and the compartment 52. When the second predetermined set point $T_2$ is exceeded the control module 208 may signal the actuators 272 to readjust the dampers to permit the flow rate of the compressor air through the ducts or openings to increase. The valve 264 may also be placed in a blocking state to prevent any compressor air from passing into the delivery line 258.

Figure 11:
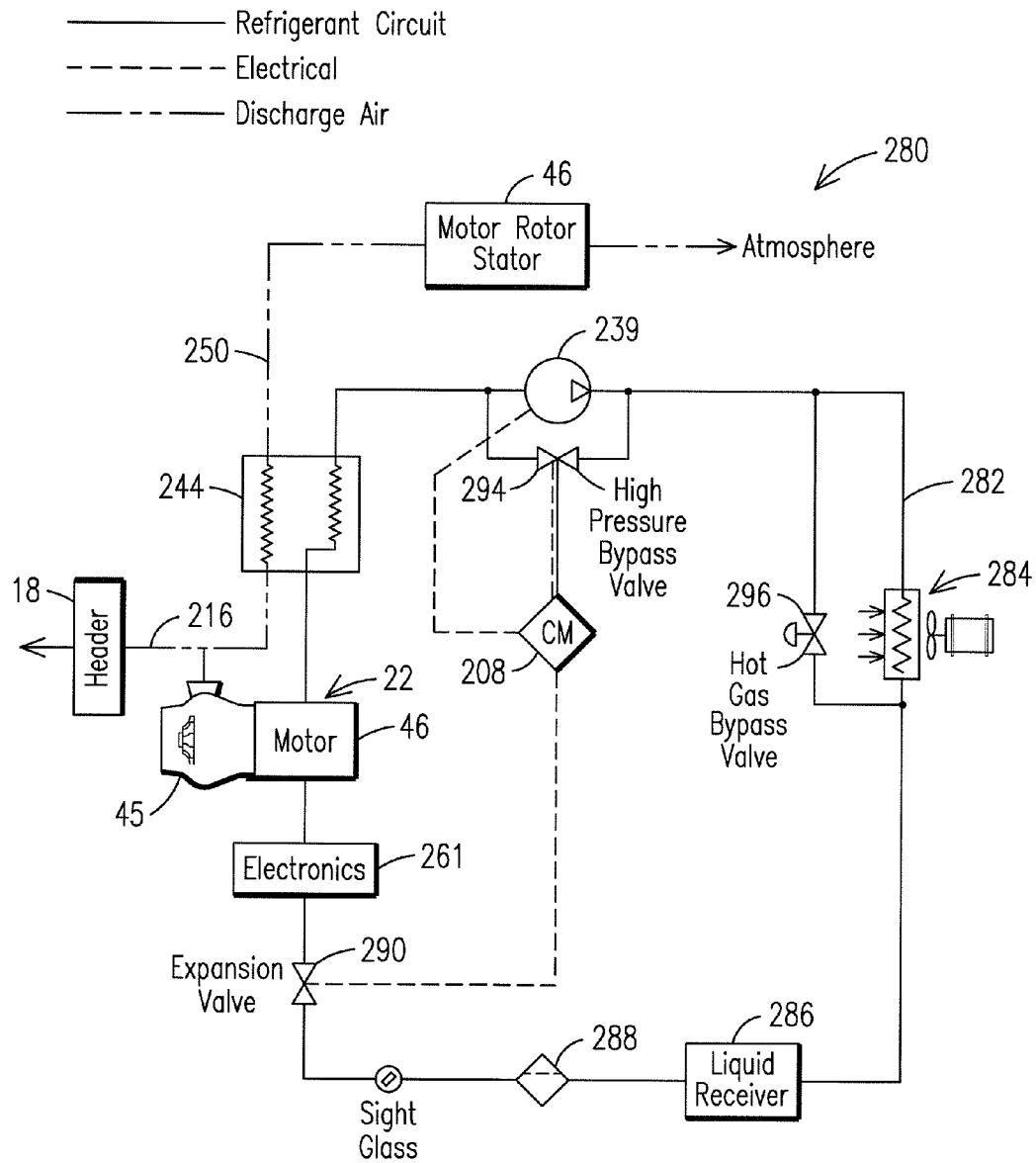
FIG. 11 illustrates a refrigeration system according to second embodiment of the invention.

A refrigeration system 280 according to another embodiment is shown in the simplified illustration of FIG. 11 where like reference numerals used to describe features of the refrigeration system 44 denote similar features of the system 280. A refrigeration compressor 239 is under the control of the module 208 for delivery of power to place the compressor in a power-on or a power-off state and to control refrigerant flow through the system. A refrigeration line 282 is shown to make a complete circuit from the compressor, through numerous components and back to the compressor.

An evaporator 284 in line with the compressor receives the refrigerant which leaves the evaporator in a liquid phase, then passes through a liquid receiver 286 and a filter 288 to an expansion valve 290 having an actuator (not shown) under control of the module 208 to effect throttling of the valve 290. Refrigerant passing through the valve 290 transitions to a gaseous state and the line 282 passes through or about a power electronics module 292 for cooling of the module.

Next the line passes into the compressor 22 for cooling of the stator of the motor 46 and then circulates through a heat exchanger 244 to cool a portion of the air output by the compressor 22. A supply line 220 from the compressor carries relatively hot compressed air into the heat exchanger where it is chilled by heat transfer to coolant in the refrigeration line 282. The warmed coolant circulates back to the compressor 239 and the chilled air 250 output from the heat exchanger is circulated through or about the motor 46 and related electronics. Specifically, the chilled air 250 provides internal cooling to components of the motor 46, e.g., by passing along the gap between the rotor and stator of the motor.

A feature of the system 280 is provision of a first bypass valve 294 to shunt refrigerant around the compressor 239 and a second bypass valve 296 to shunt refrigerant around the evaporator 284. With the valves 294, 296 under the supervision of the control module 208 the flow of refrigerant through the line 282 can be throttled to limit cooling. Accordingly, the system 280 can provide relatively warm compressor air 216 to components of the compressor unit 11 under conditions of freezing ambient temperatures which could result in condensation or ice formation in the unit 11.

Figure 8:
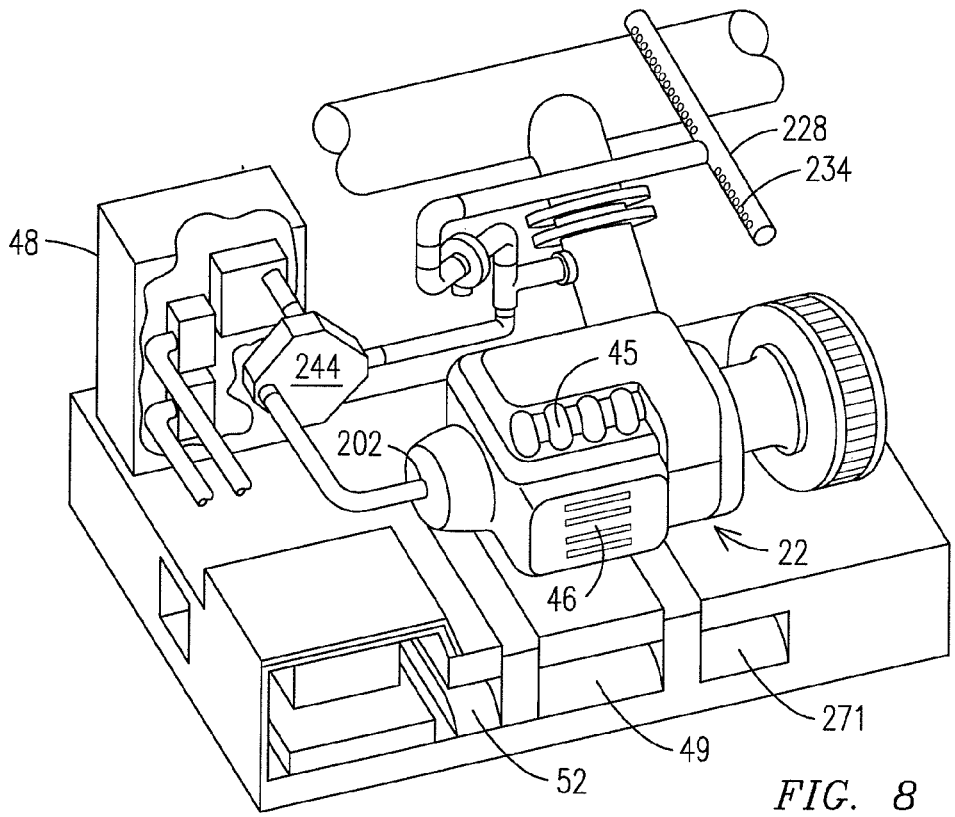
FIG. 8 is a perspective view of components of within the housing of a compressor unit shown in FIG. 1A.

It will be apparent that numerous modifications, enhancements and simplifications can be made to the thermal control system illustrated in FIGS. 1D and 1E. For example, additional valves and controls may be added to control flow of relatively hot compressor air 216 to, for example, the impeller section 45 while permitting chilled air 250 to flow to the impeller system. As a further example, FIG. 8 is a partial view of a compressor unit according to an alternate embodiment, illustrating a simplified arrangement for implementing cooling to the impeller section 45 of the compressor 22.

Figure 9:
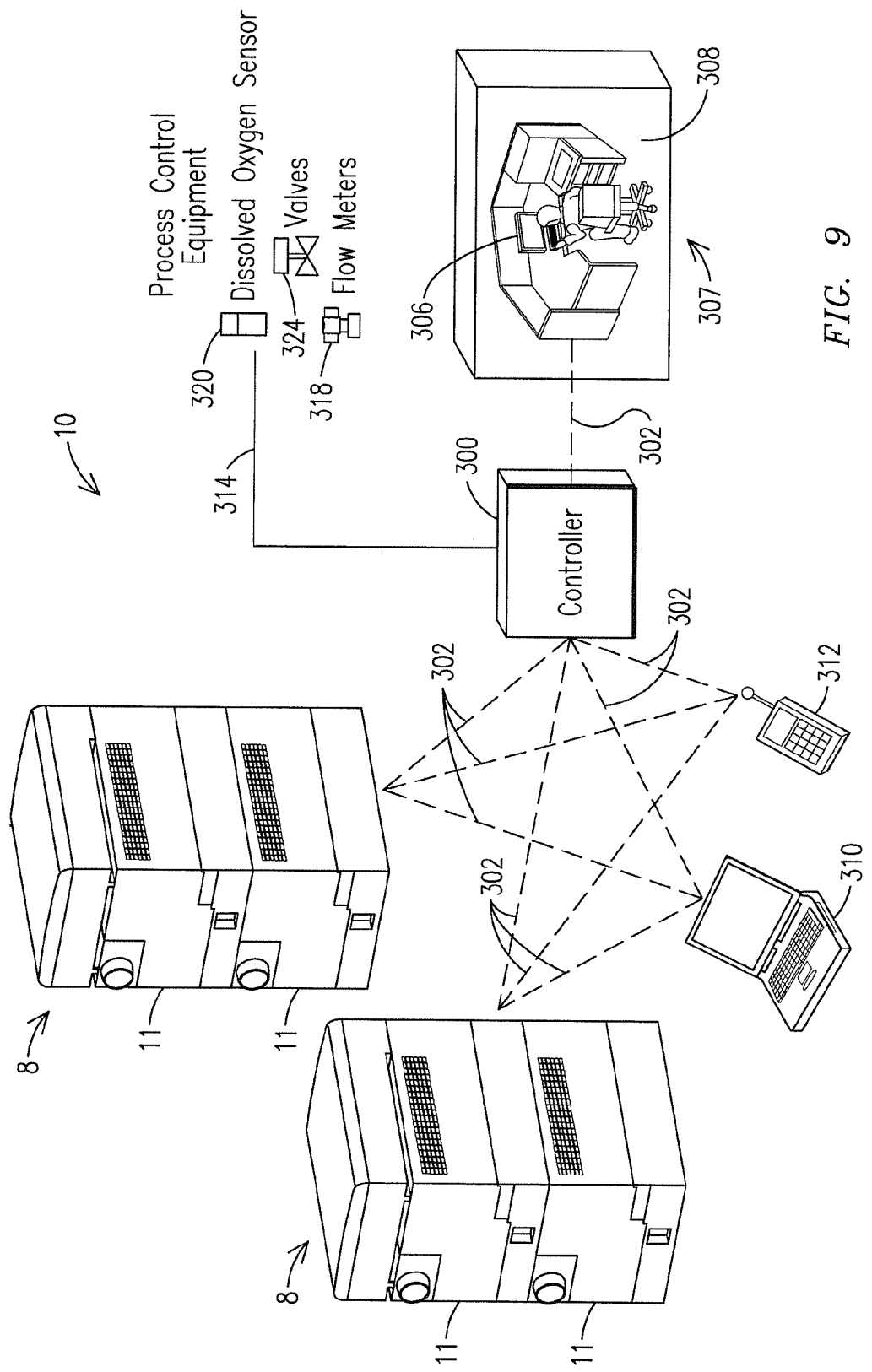
FIG. 9 illustrates a distributed network architecture suitable for implementing data exchange and controls in the Waste Water Treatment Plant of FIG. 2.

The compressor systems 8 enable provision of WWTP systems having a distributed aeration architecture in which much of the conventional infrastructure (e.g., conventional blower buildings, lengthy cabling and pipe work) is eliminated while plant efficiencies are improved. This is to be contrasted with a conventional centralized arrangement as described with reference to FIG. 11. The aeration equipment and controls are placed next to each basin 12 (e.g., within five to twenty meters of an associated basin) in a distributed arrangement. Communication links implement controls between the modules 208 in each compressor unit 11 and a central control unit 300. See FIG. 9 which illustrates an exemplary distributed arrangement for the WWTP system 10. A series of compressor systems 8 each communicate with one central control unit 300. The central controller provides networked communications to operate the compressors 22 in an energy efficient manner.

The control unit 300 and each compressor unit 11, in each of multiple compressor systems 8, communicate with one another via a series of wireless communications links 302. The control unit 300 may also communicate via a wireless link 302 directly with operator interface terminals 306 and mobile operator interface terminals 310 to provide data and receive command information. See FIG. 10 which also illustrates communications links via internet or telecommunications connections that enable remotely located operators to interface with the control unit 300 using, for example, a wireless handheld device 312.

The operator interface terminals 306 and mobile operator interface terminals 310 also communicate directly with the modules 208 in the compressor units 11, e.g., via wireless links 302, without interfacing through the control unit 300. A plant distributed control system (DCS) 307 having an operator interface terminal 306 housed in the plant control room 308 can also communicate directly with Individual components of the system 10, e.g., via wireless links 302. For example, the terminals 306 and 310 can control operations of each compressor unit 11 to control power-on, power-off and power level.

The control unit 300 is connected, e.g., through data cabling 314, to receive operational data from flow meters 318 and dissolved oxygen sensors 320 located in the basins 12. In response to this data the control unit adjusts delivery of compressed air 216 through the airlines 218 of each header 18 by controlling positions of flow control valves 324 connected in line with each airline. The unit 300 also controls the overall volume of air output by each compressor 22 to maximize energy efficiency of air delivery. With this configuration, an operator is able to set a dissolved oxygen set point for each basin 12 by communicating to the central control unit 300 via any of the operator interface terminal 306, the mobile operator interface terminal 310 or a terminal of the plant DCS 307 in the control room 308.

In response to the revised set point the control unit 300 sends adjustment commands to the control module 208 of each compressor unit 11 which supplies air to the particular basin 12 for which the dissolved oxygen set point is adjusted. In turn, the control modules 208 adjust settings of the variable frequency devices to alter the speed of the compressor motors 46. This results in a change in the compressor output. Also in response to the revised set point, the control unit 300 sends adjustment commands to actuators associated with the valves 324 to adjust the valves in accord with target dissolved oxygen levels near each airline 218.

A feature of the distributed aeration architecture is that individually controlled areas of, for example, a basin 12, are fed by the same air header which receives air from one compressor system 8. As shown schematically in FIG. 10, each compressor unit monitors header pressure with an instrument 328. The pressure data is used in conjunction with the air requirements as determined along each aeration line 218 to adjust the output of each compressor unit 11 in each compressor system while the controller 300 determines the valve settings for relative flow into each aeration line. As the flow control valve in each aeration line 218 is adjusted to provide more or less air flow, the pressure rises or drops. The controller 300 adjusts the set points of the compressor units in each system 8 to maintain the desired air pressure in the associated header.

In summary, an aeration system according to an embodiment of the invention includes a control system having three components: monitoring and control of process instrumentation, air control through each header, and sequencing of compressor outputs. The process instrumentation includes a dissolved oxygen (DO) sensor 320, an air flow meter 318 and an electric actuated air flow control valve 318. All of these instruments tie back to the main controller 300 through a hard wired connection. The operator is able to set a dissolved oxygen set point from the plant distributed control system (DCS) 307, a mobile operator interface terminal (MOIT) 310, 312, or the local operator interface terminal which interfaces directly with the controller. The dissolved oxygen level for any control area is adjusted by adjusting the air flow to that area. The airflow is controlled by adjusting the position of the flow control valve 324. This control loop which adjusts dissolved oxygen concentration based on airflow via the flow control valve operates independently for each control areas under the supervision of the controller 300.

Figure 10:
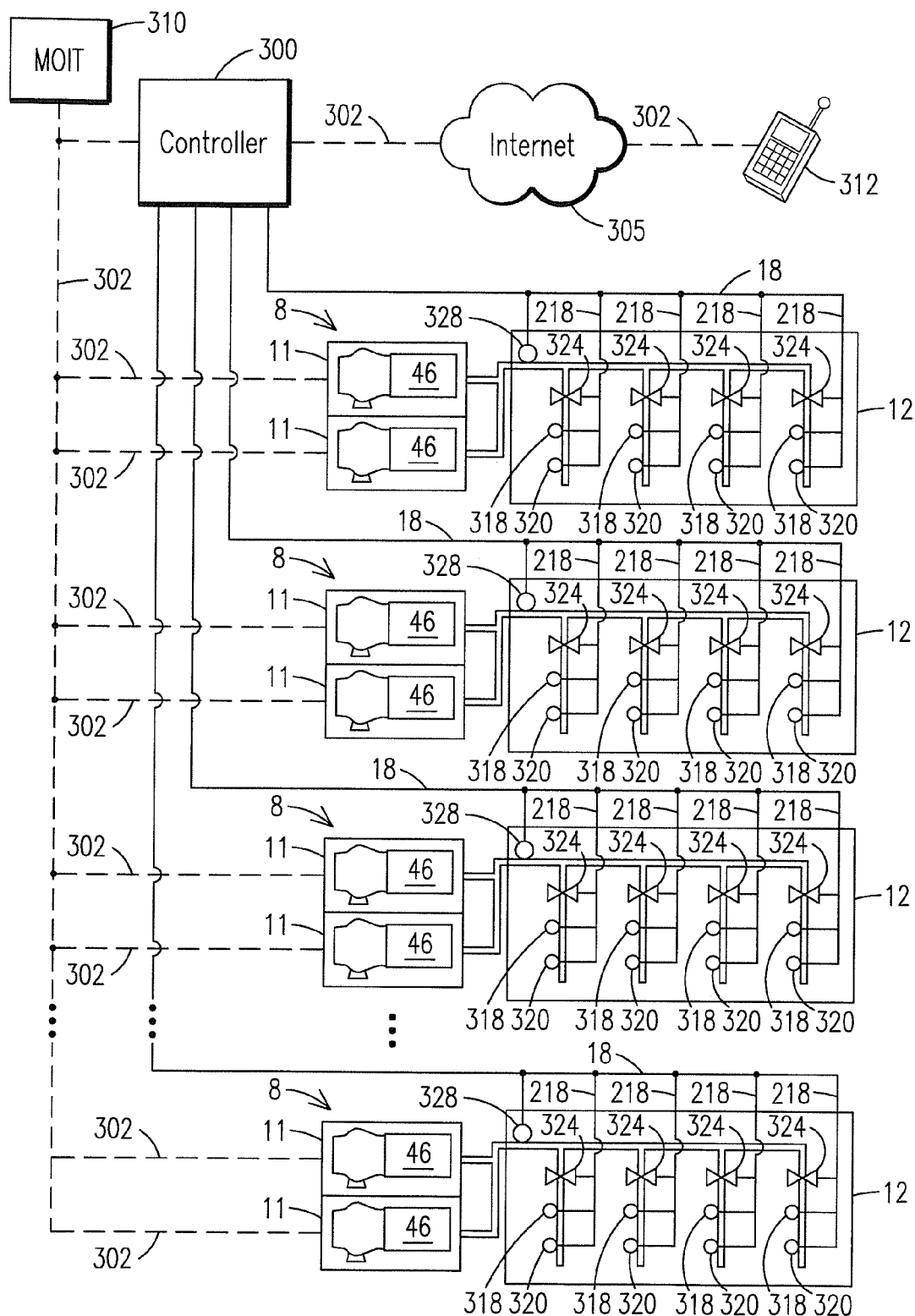
FIG. 10 further illustrates details of data exchange and system control for the architecture shown in FIG. 9.

In the example of FIG. 2, each basin 12 has a series of individual control areas, as further illustrated in FIG. 10, which are all fed by a shared main header. In this example, each compressor system comprises two compressor units 11A and 11B. The header 18 extending from each compressor system 8 to a basin 12 has a hard wired pressure sensor and transmitter 328 as well as a header pressure control loop that ties the air requirements of the individual areas to the output of the modules. This pressure set point is selectable from the mobile operator interface terminal 310, 312, or from the DCS 307. As each of the control area flow control valves 324 opens and closes to demand more or less air, the pressure as measured by the pressure sensor and transmitter rises and falls. Accordingly, the controller adjusts the set points of the compressor units 11A, 11B automatically to maintain the desired header pressure. With regard to individual aeration lines along each header 18, the controller determines a dissolved oxygen set point for each line.

The controller 300 communicates wirelessly with each of the modules. As the air demand increases or decreases, the compressors 22 in the units 11A and 11B are controlled automatically. The controller starts, stops, increases and decreases the compressor outputs in a predetermined sequence to efficiently provide the necessary air for the system. Along with this automatic control, the controller also displays the operating status of each of the compressors 22. At any point, the compressors can be placed in a manual mode and adjusted to a desired position from one of the terminals 306, 310, 312.

Features of the invention which have been described include a vortex air inlet system which removes large and heavy particles from an inlet air stream to a compressor without requiring use of a filter. For example, an air stream entering a system of cyclone separators undergoes rotation in conically shaped chambers and clean air is drawn upward through the centers of the chambers while large and heavy particles drop downward into a collection region. The collected particles may be removed with a blow-off function which uses compressor air. With the blow-off capability, the vortex air inlet system can render a pre filter system unnecessary.

Another feature of the illustrated embodiments is provision of stackable weather-proof modular units which can be formed of molded plastic. Numerous features have been described which facilitate use of the compressor system 8 in a wide variety of weather conditions. The units can be partitioned so that the air filtration system is separate from units containing compressors so that multiple compressors may be combined with a single air filtration system to form a compressor system having an arbitrary number of compressors which occupy a footprint having the same area as a system having only one compressor. Compressor units which are combined in the same stack with an air filtration system to form a compressor system can share a common air header for merging of outputs and delivery of air to the same basin(s).

Still another feature is that of a thermal control system which can be installed in accord with several embodiments. In one example, there is provided a self-cooling, self-heating system where a refrigeration system provides for cooling with both refrigerant lines and cold air. The heating feature may be based on recirculation of compressor discharge air within a housing 24 to warm up the inside of the compressor unit, and prevent formation of ice, frost and condensation. Accordingly, compressor electronics can be cooled with refrigerant and a heat exchanger can provide chilled air to cool the rotor of the compressor motor.

An aeration system network has been described. A central controller can control multiple compressor systems 10 which may each comprise multiple compressor units 11. Intervention can be had with mobile operator interface terminals via wireless communications or via a web browser across the Internet. The central controller is separate and distinct from electronics resident in the compressor units 11 and can communicate wirelessly to control modules in each compressor unit. The foregoing enable a higher level of control, operational efficiencies and flexibility. For example, an operator no longer has to stand next to a compressor unit in order to operate it or monitor the activities. With the controller and the distributed aeration architecture, there is reduced infrastructure and controls supporting the infrastructure are reduced. Further, an operator can monitor and control the compressor units and the plant aeration operations without having to be present during inclimate weather conditions.

Embodiments of the invention reduce the amount of cabling and wiring needed for a plant-wide system. Further, with the noted modularity and weather-proofing of the compressor systems 8, there is significant savings because, with location of the compressor units at the basins 12, the length of header piping, and associated pressure loss, are reduced to a minimum while buildings to house compressors are no longer needed.

According to one set of embodiments there has been described an air inlet system suitable for providing cleaned air as an input to a compressor from ambient air received into the system from a surrounding ambient environment. The system includes a plenum housing having an upper surface and a lower surface defining a first open subregion between the upper and lower surfaces. Also, a plurality of cyclone separators are arranged in spaced apart rows. The separators each include a vortex body portion, an intake portion for receiving the ambient air into the body portion, and a vortex finder tube extending from within the body portion and into the first open subregion. This arrangement provides cleaned air by removing particles from the ambient air and delivering the cleaned air from the body portion into the first open subregion. The system includes a second subregion extending between at least two of the spaced apart rows of vortex body portions. The second subregion is in fluid communication with the first subregion to receive cleaned air for movement along the second region. A port is positioned to receive for the cleaned air from the second open region for delivery as the input to the compressor. In one example the plenum housing and the cyclone separator vortex finder tubes are formed as a first unit of the system, which further includes a second unit containing the cyclone separator vortex body portions and the second open region.

A method is provided for removing particles from an air source. The air source is passed through multiple rows of cyclone separators, whereby particles are removed from the air to create cleaned air. The particles are passed through openings in the separators so that the particles fall to a surface below the openings. The cleaned air is directed into a first chamber region above the cyclone separators and moved along a second chamber region positioned between two of the rows toward a duct for passage out. In one example of the method, for each cyclone separator the step of passing the air source through the cyclone separators includes providing a downward cyclic movement of the ambient air through a portion of each separator having a conical shape and providing an upward movement of air from the portion having the conical shape through a vortex finder tube and then into the first chamber region.

A compressor system is provided for removal of particulate matter from cleaned air which enters the compressor. The system includes a compressor for generating compressed air with the cleaned air, a housing, having an upper surface, enclosing the compressor, a vortex air cleaner positioned over the compressor housing, coupled to an intake of the compressor to receive ambient air and provide the cleaned air as an output. The vortex air cleaner includes a plurality of cyclone separators positioned to drop particles removed from the ambient air over the upper surface of the compressor housing. A supply line is coupled to receive compressed air output from the compressor, and an air sweep is coupled to receive a portion of the compressed air. The sweep is positioned to emit the compressed air over the upper surface of the housing to remove particles dropped from the vortex air cleaner.

A method is also provided for removing particulate matter from a compressor system. In one embodiment particulate matter is removed from cleaned air which enters the compressor by passing air through multiple cyclone separators and removing particles from the air to create cleaned air. The particles are passed through openings in the separators so that the particles accumulate on a surface below the openings. A portion of air output by the compressor is directed along the surface over which the particles accumulate to remove the particles from the surface.

According to another embodiment, a compressor unit in a modular compressor system includes a compressor having a motor of the type having a rotor and a stator and a refrigeration cooling system that controls temperature of a motor drive unit of the compressor. The cooling system includes a refrigeration line which sends refrigerant into the motor to cool the stator. The system further includes a blow-off system of the type which vents a portion of air output from the compressor during compressor start-up to limit the rate of line pressure build-up while water is evacuated from aeration lines. The blow-off system includes a valve positioned in a supply line to controllably vent compressed air during compressor start-up. A housing encloses the compressor, the refrigeration cooling system and the blow-off system.

A compressor unit according to another embodiment has a thermal control system. The unit is of the type which outputs compressed air to an aeration system. The Compressor unit includes an air compressor having an impeller section and a motor for driving the impeller section to generate the compressed air, the motor being of the type having a rotor and a stator. The compressor unit also includes a refrigeration compressor, an evaporator, a heat exchanger and one or more electronic components. A refrigeration line carries refrigerant from the refrigeration compressor through the evaporator, through the heat exchanger, through the one or more electronic components and through the motor. The heat exchanger chills a portion of the compressed air output by the air compressor. The system includes a line carrying the chilled air to the motor for internal cooling.

There is also provided a modular compressor system for use in an aeration system which, according to one embodiment, includes an air cleaning system for receiving ambient air and discharging cleaned air, a first compressor unit positioned to receive the cleaned air and to output compressed air. The air cleaning system is designed to be placed on top of the compressor unit. A second compressor unit is also positioned to receive the cleaned air and to output compressed air. The first compressor unit is designed to be placed on top of the second compressor unit.

According to another series of embodiments, an aeration system for a waste water treatment plant having multiple aeration basins includes a plurality of compressor systems, each connected to deliver air into at least one basin to which no other compressor system delivers air. Each compressor system is positioned closer to the at least one basin to which it delivers air than any of the other compressor systems. Each in a plurality of air carrying headers is connected to one of the compressor systems to deliver air to the at least one basin to which no other compressor system delivers air. For each header, a second plurality of aeration lines are connected to the header to receive air from the associated one compressor system and deliver the air to the associated at least one basin to which no other compressor system delivers air. The aeration system may also include a dissolved oxygen sensor positioned adjacent each aeration line, a flow meter positioned to measure airflow through each aeration line and a flow control valve coupled to an actuator to adjust air flow through each aeration line.

Also according to another embodiment, a network is provided for an aeration system of the type which controls oxygen levels in water treatment basins. The network includes a controller and a plurality of compressor systems each allocated to a different basin in an aeration system. Each compressor system includes (i) an air cleaning system for receiving ambient air and discharging cleaned air and (ii) at least one compressor unit positioned to receive the cleaned air and to output compressed air. The air cleaning system is designed to be placed on top of the at least one compressor unit. Each compressor unit includes a compressor and a processor based control unit responsive to commands received from the controller. The control unit is operatively linked to other components in the unit to adjust power input to the compressor, blow-off pressure during compressor start-up and valve controls to effect cooling of components in the unit. The network may further include a header extending from each compressor system to a different basin and, for each compressor system, a plurality of aeration lines extending from the header into the basin.

According to still another embodiment, a method is provided for operating an aeration system in a waste water treatment plant of the type having multiple compressor systems which each provide air flow via a different header to a different basin in the plant. Each compressor system includes one or more compressor units. Each compressor unit includes a compressor which outputs air to a basin. The method includes monitoring and controlling process instrumentation, controlling airflow through each header, and sequencing of compressor outputs. The method is implemented by: providing a controller which monitors dissolved oxygen levels along different aeration lines in a basin of the plant, providing a processor based control module in each compressor unit of each compressor system to control operation of the compressor in the unit, and operating the controller to individually adjust settings on a plurality of the compressor systems to start, stop, increase or decrease output from each compressor unit in each compressor system in a sequence to efficiently provide necessary air flow to each basin consistent with measure dissolved oxygen levels along each associated aeration line. In one embodiment pressure data is used in conjunction with the air requirements as determined from monitored dissolved oxygen levels along each aeration line to adjust the output of each compressor in each compressor system.

In a waste water treatment plant, an aeration system provides oxygen to water in a plurality of basins. The system includes a plurality of air compressor systems, each compressor system including multiple compressor units and an air intake system which receives ambient air, provides cleaned air from the ambient air and provides the cleaned air to the compressor systems. Each compressor unit includes a compressor and a control unit which interfaces with other components within the same unit to control operations in accord with assigned set points. The system includes a plurality of headers. Each compressor system delivers air to a different basin via a different header and each header is coupled to receive compressed air from all of the compressors in one compressor system and deliver the compressed air to at least one basin. A controller monitors sensors and controls valves to provide cost efficient delivery of air from each compressor system to aeration lines in each associated basin. The controller separately communicates with the control unit in each compressor unit of each compressor system, providing commands for adjustment of set points in each compressor unit to control air flow through each header, and sequencing of compressor outputs.

There is also provided a method of operating an aeration system which feeds air to multiple water basins. The method includes providing a plurality of local processor based control modules, each controlling the operation of a compressor unit to effect functions including changes in compressor power level, thermal control and blow-off during compressor start-up. The compressor units are assembled in systems and each system is allocated to a different basin so that no two compressors provide air to the same basin. A plurality of control operations are performed with a central processor. The central processor directly controls aeration valves in each basin based on monitored oxygen levels. In one embodiment, the central processor establishes set points for operation of each compressor unit by an associated control module. In another embodiment one of the set points is determinative of air pressure delivered by a compressor unit through a header connected between the compressor unit and an associated basin.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An aeration system for a waste water treatment plant having multiple water treatment aeration basins, comprising:
   a controller; and
   a plurality of modular compressor systems each allocated to a different basin in an aeration system, each compressor system including (i) an air inlet system for receiving ambient air and discharging cleaned air and (ii) at least one compressor unit positioned to receive the cleaned air and to output compressed air, the air inlet system designed to be placed on top of the at least one compressor unit,
   each compressor unit including a compressor and a processor based control unit responsive to commands received from the controller, wherein:
   the controller is coupled to receive data from (i) a plurality of dissolved oxygen sensors each positioned to receive data from a different one of the basins, (ii) multiple flow meters indicative of air flow into each basin, and the controller is operatively coupled to adjust air flow into each of the basins;
   each control unit is coupled to respond to the controller to adjust the air flow into a basin and is also operatively linked to other components in the unit to adjust power input to the compressor, blow-off pressure during compressor start-up and valve controls to effect cooling of components in the unit; and
   each compressor system comprises a series of modular, vertically stackable units with anchoring of one unit to another unit to provide a stable structure in which the air inlet system is positioned above the compressor.

2. The aeration system of claim 1 wherein:
   each of the compressor systems is connected to deliver air into at least one basin to which no other compressor system delivers air, each said compressor system positioned closer to the said at least one basin to which it delivers air than any of the other compressor systems, the system further including:
   a plurality of air carrying headers, each connected to one of the compressor systems to deliver air to the at least one basin to which no other compressor system delivers air; and,
   for each header, a second plurality of aeration lines are connected to the header to receive air from the associated one compressor system and deliver the air to the associated at least one basin to which no other compressor system delivers air.

3. The aeration system of claim 2 further including a dissolved oxygen sensor positioned adjacent each aeration line, a flow meter positioned to measure air flow through each aeration line and a flow control valve coupled to an actuator to adjust air flow through each aeration line.

4. The aeration system of claim 3 wherein each control unit is communicatively coupled to the controller and each compressor unit in a compressor system to adjust power levels in the compressor system.

5. The aeration system claim 1 further including,
a header extending from each compressor system to a different basin and, for each compressor system:
a plurality of aeration lines extending from the header into the basin, and
process instrumentation positioned along each aeration line to control dissolved oxygen levels in the basin,
the process instrumentation coupled directly to the controller to provide process data to the controller or receive commands for adjustment of air flow through the aeration lines.

6. The aeration system of claim 1 further including a mobile operator interface terminal coupled via a wireless link to control operations of the controller and the control unit.

7. The aeration system claim 1 further including connectivity to an operator interface terminal via an internet connection.

8. A method of operating an aeration system in a waste water treatment plant, the plant including multiple compressor systems which each provide air flow via a different header to a different basin in the plant, each compressor system comprising one or more compressor units, each compressor unit including a compressor which outputs air to a basin, the method including monitoring and controlling process instrumentation, controlling air flow through each header, and sequencing of compressor outputs, wherein the method is implemented by:
providing each compressor system as a series of modular, vertically stackable units with anchoring of one unit to another unit to provide a stable structure in which an air inlet system is stackable vertically above a compressor unit;
providing a controller which monitors dissolved oxygen levels along different aeration lines in a basin of the plant;
providing a processor based control module in each compressor unit of each compressor system to control operation of the compressor in the unit, wherein each control module is coupled to respond to the controller to adjust air flow into a basin and is also operatively linked to other components in the unit to adjust power input to the compressor, blow-off pressure during compressor start-up and valve controls to effect cooling of components in the unit;
for each compressor system, stacking the air inlet system vertically above the compressor unit to receiver ambient air and discharge cleaned air as an input to the compressor unit, and positioning the air inlet system on top of at least one compressor unit in the compressor system; and
operating the controller to individually adjust settings on a plurality of the compressor systems to start, stop, increase or decrease output from each compressor unit in each compressor system in a sequence to efficiently provide necessary air flow to each basin consistent with measured dissolved oxygen levels along each associated aeration line.

9. The method of claim 8 wherein pressure data is used in conjunction with the air requirements as determined from monitored dissolved oxygen levels along each aeration line to adjust the output of each compressor in each compressor system.

10. The method of claim 9 wherein the controller determines the valve settings for relative flow into each aeration line.

11. The method of claim 10 wherein, as air flow varies in accord with adjustment of flow control valves in the aeration line, the controller adjusts set points of the compressor units in each compressor system to maintain a desired air pressure in the associated header.

\* \* \* \* \*